United States Patent
Sivakumar

(10) Patent No.: US 11,467,588 B2
(45) Date of Patent: *Oct. 11, 2022

(54) SYSTEMS AND METHODS FOR CONTROLLING AN AUTONOMOUS VEHICLE USING TARGET ORIENTATED ARTIFICIAL INTELLIGENCE

(71) Applicants: Denso International America, Inc., Southfield, MI (US); Denso Corporation, Kariya (JP)

(72) Inventor: Prasanna Kumar Sivakumar, Canton, MI (US)

(73) Assignees: Denso International America, Inc., Southfield, MI (US); Denso Corporation, Kariya (JP)

(*) Notice: Subject to any disclaimer, the term of this patent is extended or adjusted under 35 U.S.C. 154(b) by 443 days.

This patent is subject to a terminal disclaimer.

(21) Appl. No.: 16/502,602

(22) Filed: Jul. 3, 2019

(65) Prior Publication Data
US 2021/0004014 A1  Jan. 7, 2021

(51) Int. Cl.
*G01C 22/00* (2006.01)
*G05D 1/00* (2006.01)
*G05D 1/02* (2020.01)
*G06N 20/00* (2019.01)

(52) U.S. Cl.
CPC ......... *G05D 1/0217* (2013.01); *G05D 1/0088* (2013.01); *G05D 1/0221* (2013.01); *G06N 20/00* (2019.01); *G05D 2201/0213* (2013.01)

(58) Field of Classification Search
CPC .. G05D 1/0217; G05D 1/0088; G05D 1/0221; G05D 2201/0213; G06N 20/00
USPC .......................................................... 701/23
See application file for complete search history.

(56) References Cited

U.S. PATENT DOCUMENTS

| 7,519,457 | B2 | 4/2009 | Hasegawa et al. |
| 8,098,245 | B2 | 1/2012 | Chen et al. |
| 10,254,759 | B1 | 4/2019 | Faust et al. |
| 10,584,971 | B1* | 3/2020 | Askeland ............... G01C 21/30 |
| 10,803,360 | B2* | 10/2020 | Park .................... G06K 9/00201 |

(Continued)

OTHER PUBLICATIONS

Bojarski et al., "End to End Learning for Self-Driving Cars," arXiv:1604.07316v1 [cs.CV] Apr. 25, 2016.

(Continued)

*Primary Examiner* — Mahmoud S Ismail
(74) *Attorney, Agent, or Firm* — Christopher G. Darrow; Darrow Mustafa PC

(57) ABSTRACT

An artificial intelligence system for an autonomous vehicle includes one or more processors and a memory in communication with the one or more processors and storing a target-orientated navigation system module. When executed, the target-orientated navigation system module causes the one or more processors to receive sensor data from one or more sensors of a vehicle, synchronize the sensor data, preprocess the synchronized sensor data by transforming the sensor data into a common data format, concatenate the transformed sensor data into a K-dimensional array, which acts as an input state array, apply a navigation policy to the input state array to estimate an action-value array, direct a vehicle control system to guide the vehicle to a location representative of a cell in the action-value array that has a highest reward value.

20 Claims, 14 Drawing Sheets

(56) References Cited

U.S. PATENT DOCUMENTS

| | | | |
|---|---|---|---|
| 2014/0244142 | A1 | 8/2014 | Matsubara |
| 2015/0057835 | A1 | 2/2015 | Streubel |
| 2018/0032082 | A1 | 2/2018 | Shalev-Shwartz et al. |
| 2018/0348343 | A1* | 12/2018 | Achour .............. H01Q 15/0066 |
| 2019/0004524 | A1 | 1/2019 | Wang et al. |
| 2019/0049967 | A1 | 2/2019 | Lim et al. |
| 2020/0074239 | A1* | 3/2020 | Park .................... G06K 9/6262 |
| 2021/0286050 | A1* | 9/2021 | Achour .................. G01S 7/415 |

OTHER PUBLICATIONS

Jaritz et al., "End-to-End Race Driving with Deep Reinforcement Learning," arXiv:1807.02371v2 [cs.CV] Aug. 31, 2018.

Xu et al., "End-to-end Learning of Driving Models from Large-scale Video Datasets," arXiv:1612.01079v2 [cs.CV] Jul. 23, 2017.

Zhu et al., "Robot Path Planning Based on Artificial Potential Field Approach with Simulated Annealing," Sixth International Conference on Intelligent Systems Design and Applications, 6 pages (2006).

Kim et al., "New Potential Functions for Multi Robot path planning: SWARM or SPREAD," The 2nd International Conference on Computer and Automation Engineering, vol. 2, 5 pages (2010).

Ge et al., "New Potential Functions for Mobile Robot Path Planning," IEEE Transactions on Robotics and Automation, vol. 16, Issue 5 (2000).

* cited by examiner

SYSTEMS AND METHODS FOR CONTROLLING AN AUTONOMOUS VEHICLE USING TARGET ORIENTATED ARTIFICIAL INTELLIGENCE

TECHNICAL FIELD

The subject matter described herein relates in general to artificial intelligence systems and methods, and more particularly to artificial intelligence systems and methods for controlling an autonomous vehicle.

BACKGROUND

The background description provided is to generally present the context of the disclosure. Work of the inventor, to the extent it may be described in this background section, and aspects of the description that may not otherwise qualify as prior art at the time of filing, are neither expressly nor impliedly admitted as prior art against the present technology.

Artificial intelligence ("AI") represents a significant advancement in approaches to electronic processing capabilities. For example, the ability of a computing system to perceive aspects of an environment or data, and make intelligent determinations therefrom is a potentially powerful tool regarding many different applications. Some of these applications include vehicle navigation of an autonomous or semi-autonomous vehicle, gameplay, robotics, and financial transactions.

With regards to vehicle navigation, some current vehicle navigation systems are broken down into separate sub-systems that perform defined tasks like object detection and tracking and free space detection. The results generated by the sub-systems are then provided to the navigation system, which then ties the results of all the sub-systems together as an input to a vehicle controller sub-system, which controls the movement of the vehicle. The problem with this type of system is that if one of the sub-systems fail, the final output will be erroneous. More often, each sub-system is developed independent of the other and does not look at the goal of reaching a target holistically. Also, such systems tend to make assumptions about the distance between two vehicles on the road and their characteristics and use a set of rules. This can result in a high failure rate.

Other types of navigation systems try to predict one or more actuation commands (acceleration, steering angle, braking) directly from the sensor information using machine learning models. These types of systems are generally referred to as "End-To-End" navigation/driving systems. While these systems do not break the problem into sub-systems, the output of the systems may still be erroneous because machine learning models are not accurate enough when predicting real values, especially in a complex self-driving environment. Also, when these machine learning models are trained in a supervised way, the navigation may be very deterministic meaning that the model does not adjust to any sudden unforeseen changes on the road, such as a sudden gush of wind, slippery road, etc.

SUMMARY

This section generally summarizes the disclosure and is not a comprehensive explanation of its full scope or all its features.

In one embodiment, an artificial intelligence system for an autonomous vehicle includes one or more processors and a memory in communication with the one or more processors that stores an input state array generation module, an action-value array generation module, and a direction module. The input state array generation module when executed by the one or more processors cause the one or more processors to receive sensor data from one or more sensors of a vehicle, the sensor data having a time stamp, synchronize the sensor data to generate synchronized sensor data, wherein the sensor data are synchronized based on a comparison between the time stamps of the sensor data, preprocess the synchronized sensor data by transforming the sensor data into transformed sensor data having a common data format, and concatenate the transformed sensor data into a K-dimensional array, wherein the K-dimensional array is an input state array.

The action-value array generation module when executed by the one or more processors cause the one or more processors to apply a navigation policy to the input state array to estimate an action-value array having a plurality of cells. The navigation policy may be trained through reinforcement learning to account for predefined navigational constraints in order to provide a desired navigational action. The action-value array may be an array representing a plane in front of the vehicle, wherein the plurality of cells of the action-value array contains an expected long term reward value of driving the vehicle towards a corresponding cell, values of the plurality of cells of the action-value array being representative of a distance between the vehicle and a target the vehicle intends to reach and a distance between the vehicle and one or more objects the vehicle wants to avoid.

The direction module when executed by the one or more processors cause the one or more processors to direct a vehicle control system to guide the vehicle to a location representative of a cell in the action-value array that has the highest reward value.

In another embodiment, a method for operating an autonomous vehicle may include the steps of receiving sensor data having a time stamp from one or more sensors of a vehicle, synchronizing the sensor data based on a comparison between the time stamps of the sensor data, preprocessing the synchronized sensor data by transforming the sensor data into a common data format, concatenating the transformed sensor data into an input state array, and applying a navigation policy to the input state array to estimate an action-value array, and direct a vehicle control system to guide the vehicle to a location representative of a cell in the action-value array that has the most desirable reward value.

In either the system or the method, the navigation policy may be trained through reinforcement learning to account for predefined navigational constraints in order to provide a desired navigational action. The action-value array may represent a plane in front of the vehicle. The cells of the action-value array contain an expected long-term reward value of driving the vehicle towards the corresponding cell. The values of the action-value array being representative of a distance between the vehicle and a target the vehicle intends to reach and a distance between the vehicle and one or more objects the vehicle wishes to avoid.

In another embodiment, a target orientated artificial intelligence system includes one or more processors and a memory in communication with the one or more processors that stores an artificial intelligence potential field imaging module. When executed by the one or more processors, the artificial intelligence potential field imaging module causes the one or more processors to receive an origin value representing a current position and a destination value representing a target position, discretize an N-dimensional potential field array having a plurality of cells around the current position, compute potential values for the cells of the plurality of cells of the N-dimensional potential field array as a function of a proximity of the current position from the target position, and produce an N-dimensional potential field image based on the N-dimensional potential field array, the N-dimensional potential field image having pixels corresponding to the cells of the N-dimensional potential field array.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Disclosed are systems and methods for generating an artificial potential field and a target orientated artificial intelligence navigation system. With regards to generating the artificial potential field, the artificial to potential field may be an image of a field surrounding a target. The target could be a target destination for vehicle, a high score for videogame, a budget requirement for business, or any type of target. The artificial potential field is a visualization of how close one is to a target. As one gets closer to the target, the values of the artificial potential field, possibly represented by more intense colors, may increase.

Figure 1:
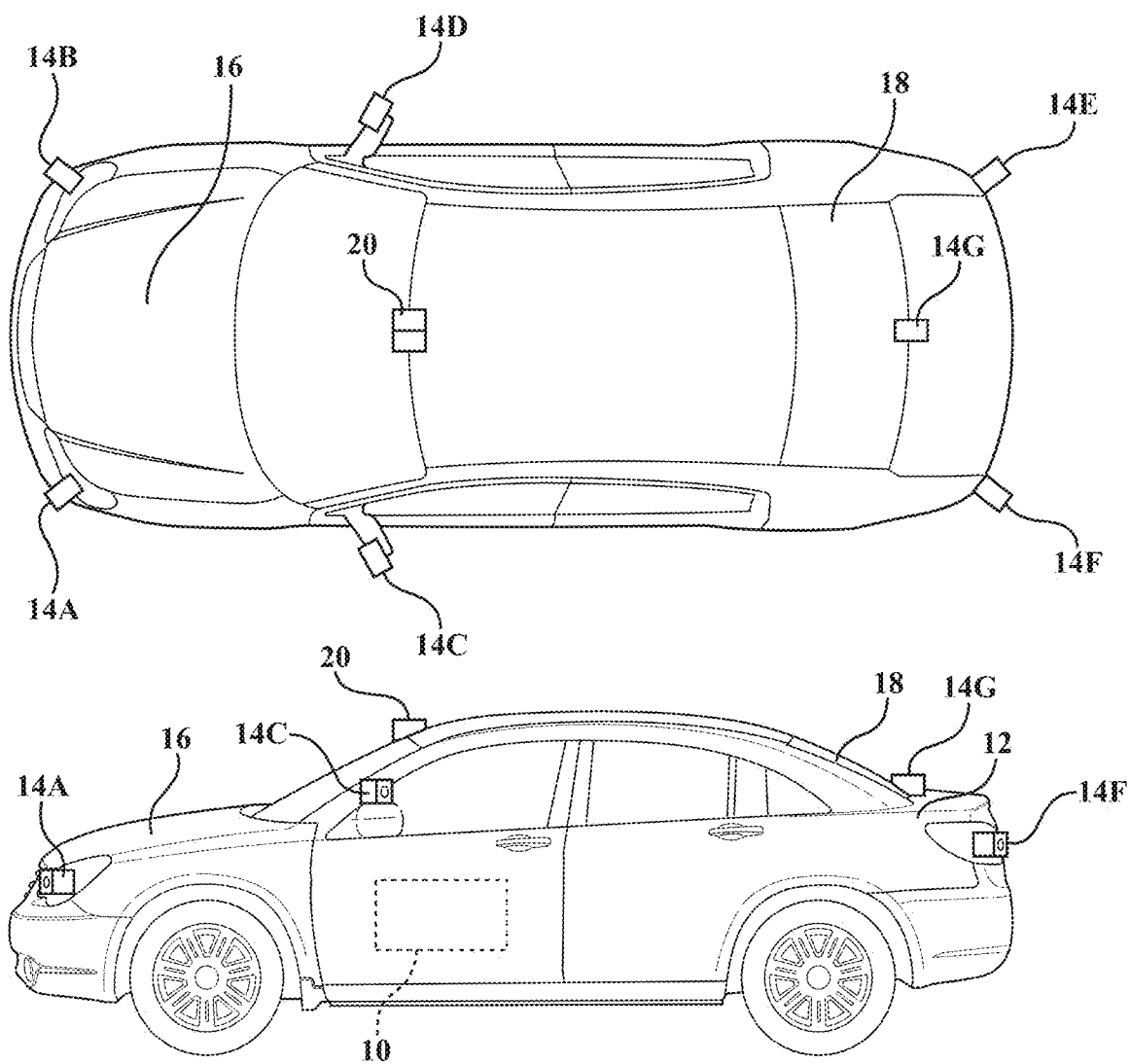
FIG. 1 illustrates a vehicle having an artificial intelligence system for controlling the vehicle.

With regards to the target orientated artificial intelligence navigation system, this type of navigation system may be incorporated within a vehicle piloting the vehicle to a target. In order to pilot the vehicle to the target, the system may generate an action-value array that represents a plane in front of the vehicle. The cells of the input state array contain values based on a reward function. The higher (or lower, depending on the case) the values are, the more desirable it is to pilot the car towards that cell. The values of the cells are generated by a navigation that may be trained through reinforcement learning to account for predefined navigational constraints in order to provide a desired navigational action Referring to FIGS. 1 and 2, a system 10 for controlling an autonomous vehicle 12 is shown. Here, the autonomous vehicle 12 is shown to be an automobile. However, the autonomous vehicle 12 may be any type of vehicle capable of transporting persons or items from one location to another. As such, the autonomous vehicle 12 could be an automobile, as illustrated, but can also be a truck, heavy-duty truck, tractor-trailer, tractor, mining vehicle, military vehicle, construction vehicle, and the like. Furthermore, the autonomous vehicle 12 may not necessarily be a land-based vehicle but could also be an aircraft or a seagoing vessel. Additionally, the autonomous vehicle 12 may also be able to operate in a semi-autonomous mode, wherein the operator of the vehicle 12 has some control over the operation of the vehicle 12. As such, the term autonomous vehicle does not necessarily mean to be a vehicle that can only operate in an autonomous mode, but also includes vehicles that operate in other modes as well. The autonomous vehicle 12 may be equipped with one or more cameras 14A-14G (shown as element 14 in FIG. 2). In one example, the cameras 14A-14G may be single optic cameras. However, it should be understood that any type of vision system may be utilized. For example, single optic cameras 14A and 14B may be located near the forward end 16 of the vehicle 12 to be able to capture images forward of the vehicle 12. Single optic cameras 14C and 14D may be located on opposite sides of the vehicle 12 to be able to capture images from the left and right side of the vehicle 12, respectively. Additionally, single optic cameras 14E-14G may be located at a rearward end 18 of the vehicle 12 to be able to capture images rearward of the vehicle 12.

The autonomous vehicle 12 may also be equipped with a forward-facing stereoscopic camera 20. However, it should be understood that any type of vision system may be utilized. The forward-facing stereoscopic camera 20 can capture images forward of the vehicle 12. The stereoscopic capabilities of the camera 20 simulate human binocular vision, and therefore, the stereoscopic camera 20 can capture three-dimensional images with the appropriate processing.

The autonomous vehicle 12 may also be equipped with other sensors that can detect the presence and/or movement of objects external to the vehicle 12. For example, the sensors may include a sonar sensor 22, a radar sensor 24 and/or a light detection and ranging system 26. Of course, these are mere examples of different types of sensors that may be utilized by the vehicle 12. The vehicle 12 may include any one of several different types of sensors in any conceivable configuration.

The vehicle 12 may also be equipped with a Global Navigation Satellite System ("GNSS") system 28. The GNSS system 28 may be any one of several different systems, including GPS, GLONASS, Galileo and/or BeiDou. As it is well known, the GNSS system 28 includes an antenna 30 that can receive one or more signals 32A-32D from one or more GNSS satellites 34A-34D. The GNSS system 28 can interpret the one or more signals 32A-32D from the one or more GNSS satellites 34A-34D to provide a location of the vehicle 12 in the form of a coordinate-based system. This coordinate-based system may include information regarding the latitude, longitude, and altitude of the vehicle 12.

The vehicle 12 may also be equipped with one or more processors 40. The one or more processors 40 may be in communication with a memory device 42 that may include instructions to perform any of the methodologies mentioned in this disclosure. The memory device 42 may be separate from the one or more processors 40 or, alternatively, could be incorporated within the one or more processors 40.

The one or more processors 40 can control the vehicle 12 using several actuators. These actuators may include a throttle actuator 44, a steering angle actuator 46, and/or a braking actuator 48. The throttle actuator 44 controls the forward and/or rearward movement of the vehicle 12. The steering angle actuator 46 controls the steering angle of the vehicle 12. The braking actuator 48 controls the brakes of the vehicle 12. The one or more processors 40 by modulating the actuators 44, 46, and/or 48 can control the movement of the vehicle 12.

While it is noted that three types of actuators are mentioned above—the throttle actuator 44, steering angle actuator 46, and a braking actuator 48—it should be understood that depending on the propulsion methodology of the vehicle (fully electric, hybrid electric, internal combustion engine, hydrogen, etc.) different types of actuators may be required or could be removed. As such, the number of actuators and different types of actuators used to control the vehicle 12 are only examples and may change depending on the requirements of the vehicle 12.

As will be explained in the paragraphs that follow, the memory device 42 stores a potential field imaging module 50A. When executed by the one or more processors 40, the one or more processors 40 can generate an artificial potential field image. An artificial potential field image (sometimes referred to as a potential field image) is an imaginary potential field emitted by a "target state." A target state is a goal the system is trying to reach. For example, in autonomous driving navigation, the goal could be the destination location the vehicle is trying to reach. The potential field image is similar in concept to an electrical potential field in that the closer an object is to the potential source, the stronger the potential field is experienced by the object. In the case of potential field image, the closer the system is to the target state, the stronger the potential is experienced by the system. Intuitively, the potential experienced by the system represents how close the system graphically is to a goal location.

The representation of how close the system is to a target in a graphical form has several advantages, especially as it relates to improved computational performance. Recent advancements in graphics processing units ("GPUs"), allow GPUs to process large amounts of graphical data in a given time. With subsequent developments in AI libraries and frameworks that can process this large data, astonishingly accurate results can be achieved. As such, this allows for innovation in computer technology, namely digital image processing of a graphical form of how close the system is to a goal location, which in this case reflects both an improvement in the functioning of the computer and an improvement in the technology of target orientated navigation.

Figure 3:
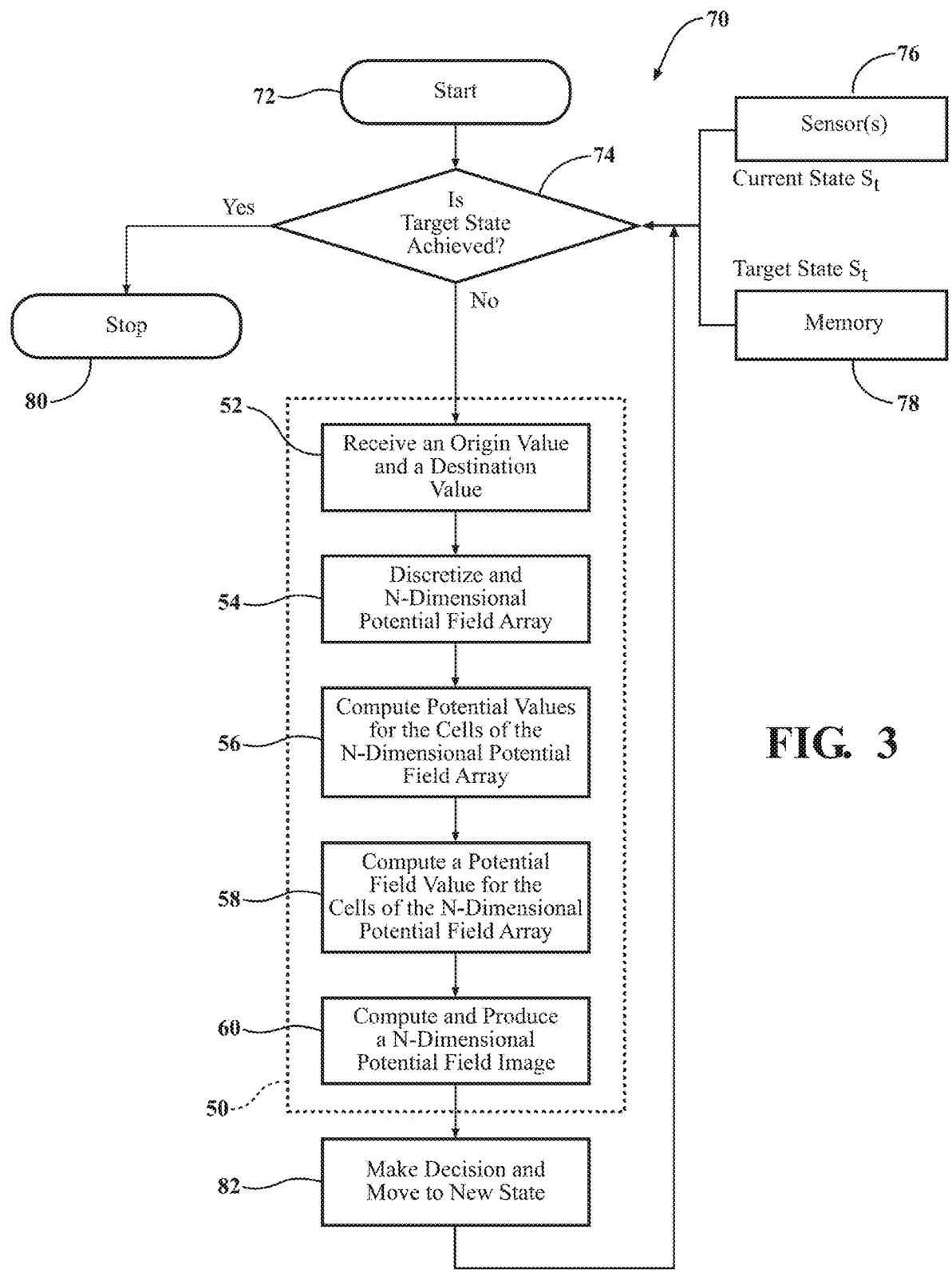
FIG. 3 illustrates a method for generating a potential field image.

Referring to FIG. 3, a method 70 that may be executed by the one or more processors 40 of the system 10 is shown. The method 70 includes the steps of not only generating the potential field image but also utilizing the potential field image to move to a target state. Before describing the steps of moving to a target state utilizing the potential field image, this description will first describe the steps needed to generate the potential field image. As stated before, the potential field imaging module 50A may be stored on the memory device 42 of the system 10. When executed by the one or more processors 40, the potential field imaging module 50A configures the processor to generate a potential field image, which may also be referred to as an N-dimensional potential field image.

In order to generate the potential field image, the potential field imaging module 50A begins with step 52. In step 52, the one or more processors 40 receive an origin value representing a current position and a destination value representing a target position. The origin value may be of value generated by the GNSS system 28 that represents the current position of the vehicle 12 of FIG. 1. The destination value may be the position that the vehicle 12 wishes to travel to. This may also be referred to as a target position.

The origin value and/or the destination value may be represented numerically. The numeric representation of the origin value and/or the destination value may be in the form of a coordinate system. This coordinate system may include a latitude, longitude, and altitude representative of the current position and/or the target position.

Proceeding to step 54, in this step the one or more processors 40 may discretize an N-dimensional potential field array having a plurality of cells around the current position. Moreover, an N-dimensional space around the current position is discretized into the N-dimensional potential field array. As an example, if the origin value is, 43.72356, −82.16958 and 239.5 m. The N-dimensional potential field array around the current position could span from 42.72356 to 44.72356 on the latitude incrementing by 0.1 degrees (20 discrete values), −81.16958 to −83.16958 on the longitude incrementing by 0.1 degrees (20 discrete values) and 234.5 m to 244.5 m on the altitude incrementing by 0.5 m (20 discrete values). As such, the 3-D space around the current state has 20*20*20=8000 cells.

In step 56, the one or more processors 40 may compute potential values for the cells of the plurality of cells of the N-dimensional potential field array as a function of a proximity of the current position from the target position. Moreover, for the cells in the N-dimensional potential field array around the current position, the one or more processors 40 will compute a numeric value of the cell ($v_c$) with respect to the target state. A function ($f$) is pre-defined and takes the current position and the target position as input and computes a numeric value for each cell. This function, $f$, may vary depending on the application. In one example, the numeric value of a cell ($v_c$) could be the distance of the cell's location represented by latitude, longitude and altitude ($s_c$) to the destination location. The function, $f$, is the distance calculating function: $v_c = f(s_c, s_t)$.

In one example, the one or more processors 40 may compute numerical values for the cells of the N-dimensional potential field array, represented by row index i and column index j, of the plurality of cells with respect to the target position by dividing an area of K by K m² around the current position into a grid of equal number of cells (M) along an axis, the dimension of the cells are k by k m² where k=K/M, wherein a distance ($d_{ELij}$) to the cells to the current position is expressed as $$d_{ELij} = \sqrt{\left(\left(i-\frac{M}{2}\right)*k\right)^2 + \left(\left(j-\frac{M}{2}\right)*k\right)^2}$$

wherein a distance ($d_{TE}$) between the target position and the current position based on coordinates,
wherein the numerical values for the cells of the plurality of cells with respect to a target position ($d_{TLij}$) between the cell and the target position is expressed as:

$$d_{TLij} = \sqrt{d_{ELij}^2 + d_{TE}^2 + 2*d_{ELij}*d_{TE}*\cos(\theta)}, \text{ and}$$

wherein θ is an angle made between lines connecting current position and cell and current position and target.

The potential value ($\varphi_{ij}$) for the cells of the plurality of cells of the N-dimensional potential field array may be expressed as:

$$\varphi_{ij} = e^{-\left(\frac{d_{TLij}^2}{2\sigma^2}\right)},$$

wherein σ is a pre-defined standard deviation value.

In step 58, the one or more processors 40 may compute a potential field value for cells of the N-dimensional potential field array. For each cell in the N-dimensional potential field array around the current position, the one or more processors 40 may compute a potential value ($\varphi_c$) experienced by the cell using, for example, a zero mean, normal distribution given by N ($v_c$|0, σ) where σ is the standard deviation of the potential field image. The standard deviation (σ) is a scaling factor that determines the radius (r) of the potential field image. In one example, it could be a pre-determined static value by itself or computed back from the pre-determined radius of the potential field image. For example, σ=r/3; r=3*σ. In one example, if the pre-determined radius of potential field image of the destination location is 30 m, then the σ is 10.

In step 60, the one or more processors 40 may compute and produce an N-dimensional potential field image based on the N-dimensional potential field array. The N-dimensional potential field image may have pixels corresponding to the cells of the N-dimensional potential field array. This may be accomplished by assigning color-intensity values to the pixels of the N-dimensional potential field image. The color-intensity values may be based on a corresponding value of the N-dimensional potential field array and a look-up table.

In one example, the one or more processors 40 may create a blank image N-dimensional image with the resolution same as the grid size. The one or more processors 40 may compute the color value ($g_c$) using the potential value ($\varphi_c$) of the corresponding cell using a pre-defined mapping function M that maps the potential value to a color intensity. The color-map could be grayscale where the potential value is mapped to a value between 0 and 255 or it could be RGB (red, green, and blue) or HSV (hue, saturation, value), where the potential value is mapped to three different intensities.

Still referring to FIG. 3, a description of the other steps of FIG. 3 detailing a method 70 for moving from a current position to a target position will be explained. The method 70 begins at step 72. At step 74, a determination is made by the one or more processors 40 if the target state has been achieved. The target state is achieved when the current position matches the target position. This determination can be made by utilizing information from one or more sensors 76 and the stored target position from a memory 78. The sensors 76 may include the sensors 14, 20, 22, 24 and/or 26 of FIG. 2 and/or the GNSS system 28 also of FIG. 2. The memory 78 may be the memory device 42 of FIG. 2.

If the target state has been achieved, the method stops as indicated in step 80. Otherwise, the method continues to the potential field imaging module 50A wherein steps 52, 54, 56, 58, and 60 are executed which was previously described in the paragraphs above. Once those steps have been performed, the method continues to step 82 where a decision is made by the one or more processors 40 to move to the new state. The decision to move to a new state may be based on moving to a location that is represented as having a higher or more valuable color value of the N-dimensional potential field image. After step 82 is executed, the method returns to step 74.

Brief mention is made regarding the terms "higher", "greater", "more desirable" "more valuable", and the like. Throughout this disclosure, these terms may be utilized as comparative terms, for example, "a location having a higher or more valuable value of the N-dimensional potential field image." The term "higher" or "greater" or "more intense" and similar regarding a value may mean a more favorable value. In some cases, a higher value may be indicative of a more favorable value. In other instances, a lower value may be indicative of a more favorable value. The same is true with "greater" or "more intense" and similar.

Figure 2:
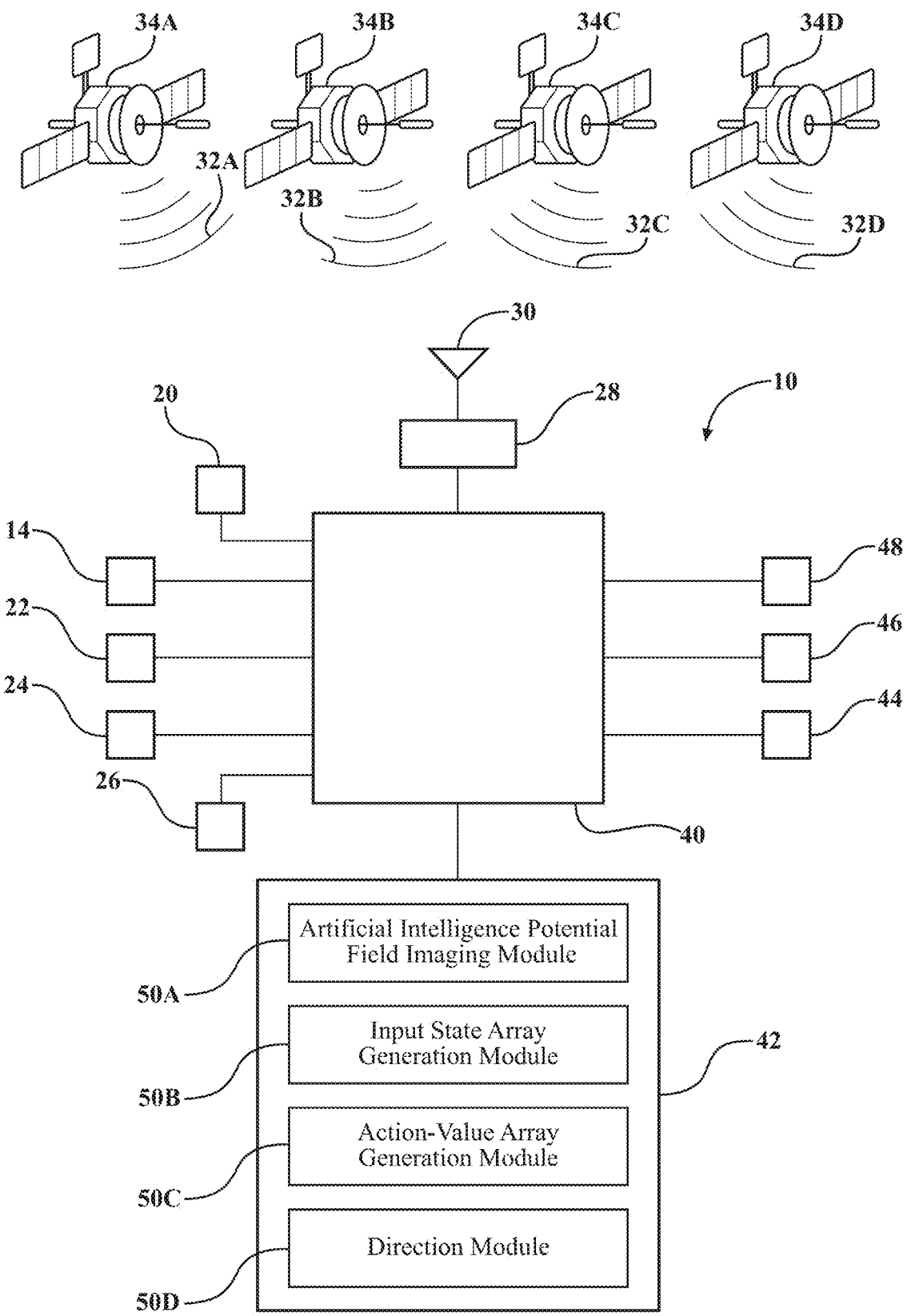
FIG. 2 illustrates a more detailed view of the artificial intelligence system for controlling the vehicle of FIG. 1.

In order to give a better visualization of the method 70 of FIG. 2, reference is made to FIGS. 4A-4D. These figures show an N-dimensional potential field image 84. The N-dimensional potential field image 84 also illustrates current position value 86 and a destination position value 88. As can be seen in FIGS. 4A-4D, the intensity of the colors of the N-dimensional potential field image 84 change as one gets closer to the destination position value 88.

Figure 4A:
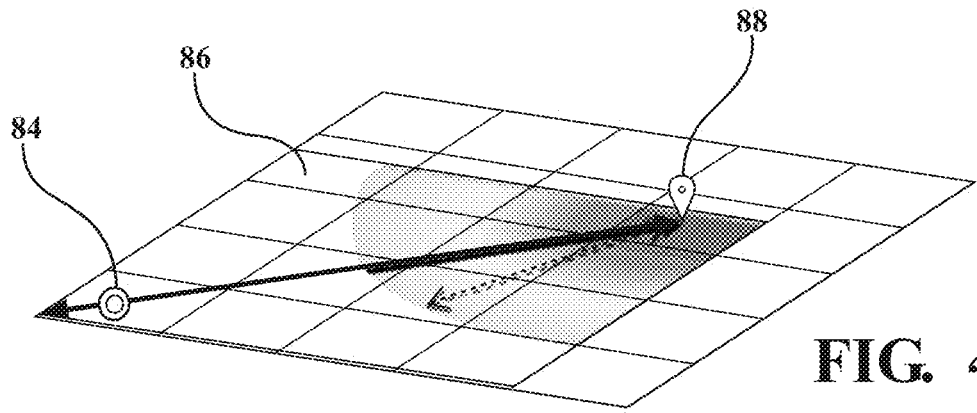
FIGS. 4A-4D illustrate a potential field image as an object moves closer to a target.
Figure 4B:
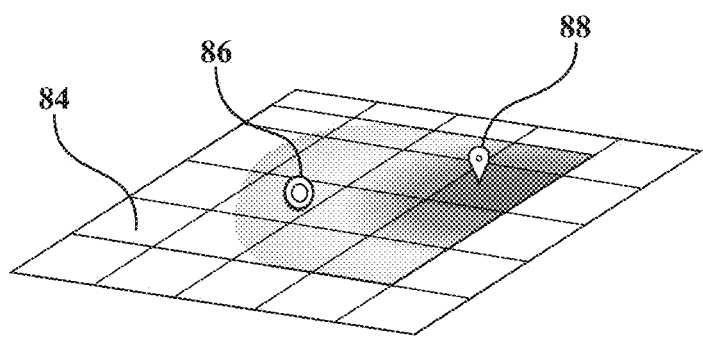
Figure 4C:
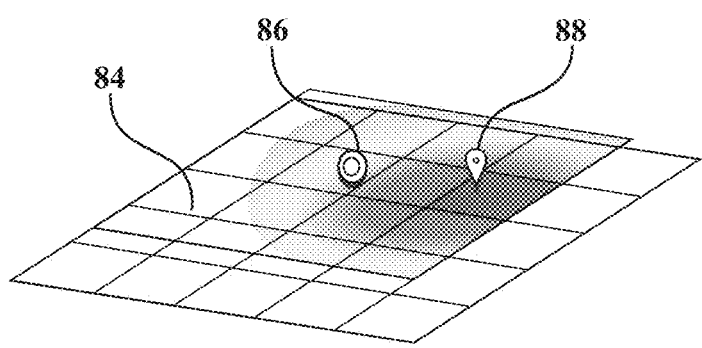
Figure 4D:
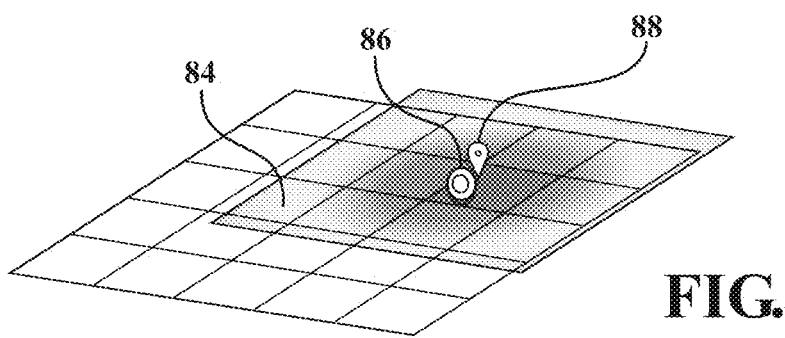

For example, in FIG. 4A, the current position value 86 is relatively far away from the destination position value 88. As the object moves closer to the destination, as illustrated in FIGS. 4B-4D, the current position value 86 will be located on a more intense color of the N-dimensional potential field image 84. As such, the method 70 considers that it is more desirable to move to a location on the N-dimensional potential field image 84 that has a more intense color.

Figures 5A, 5B, 5C, 5D:
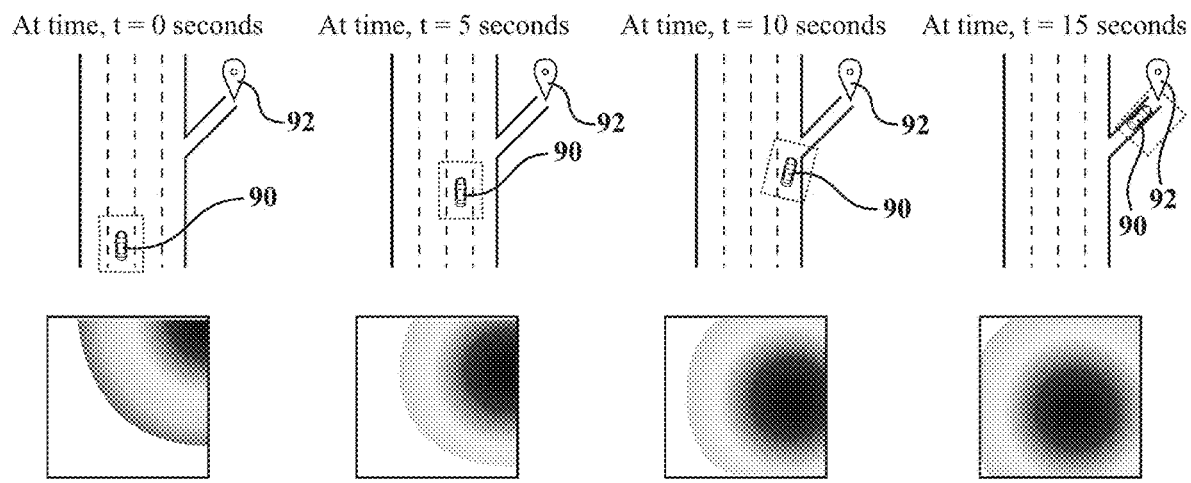
FIGS. 5A-5D illustrate a potential field image when the object is a vehicle and moves closer to a target.

In another example shown in FIGS. 5A-5D, a vehicle 90 which is representative of a current position desires to go to a target 92. An N-dimensional potential field image 94 as shown in each the figures that illustrate the color intensity as the vehicle 90 gets closer to the target 92. The vehicle 90 may be equipped with a system similar to the system 10 of FIG. 2 that is configured to determine the N-dimensional potential field image 94 and control the vehicle 90 such that the vehicle 90 will be driven to the target 92 by utilizing the N-dimensional potential field image 94. The system will want to pilot the vehicle 90 so that the vehicle 90 is moved to a more intense color shown in the N-dimensional potential field image 94. Eventually, this movement of the vehicle 92 a more intense color will eventually result in the vehicle arriving at its target 92 as best shown in FIG. 5D.

While the generation and use of an N-dimensional potential field has been described in the previous paragraphs as being applicable for navigating an autonomous vehicle, it should be understood that the generation and use of an N-dimensional potential field can be utilized in other target orientated systems, wherein the target is not necessarily a destination but could be any conceivable outcome.

Figure 6A:
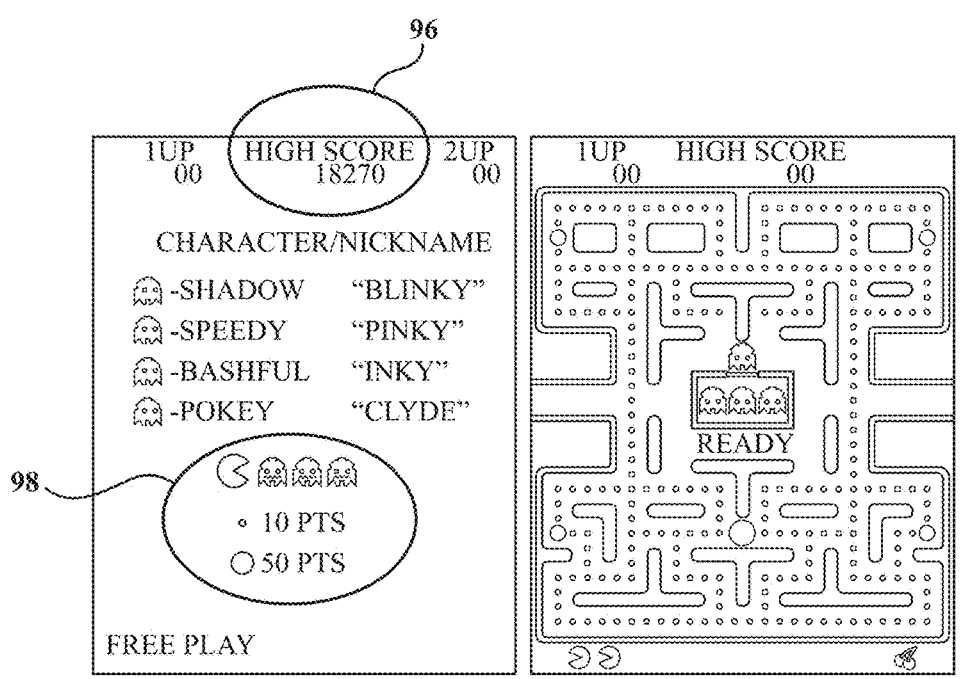
FIGS. 6A-6C illustrate a screen shot of a Pac-Man type game and potential field images utilized in the Pac-Man type videogame that utilizes a high score as a target.
Figure 6B:
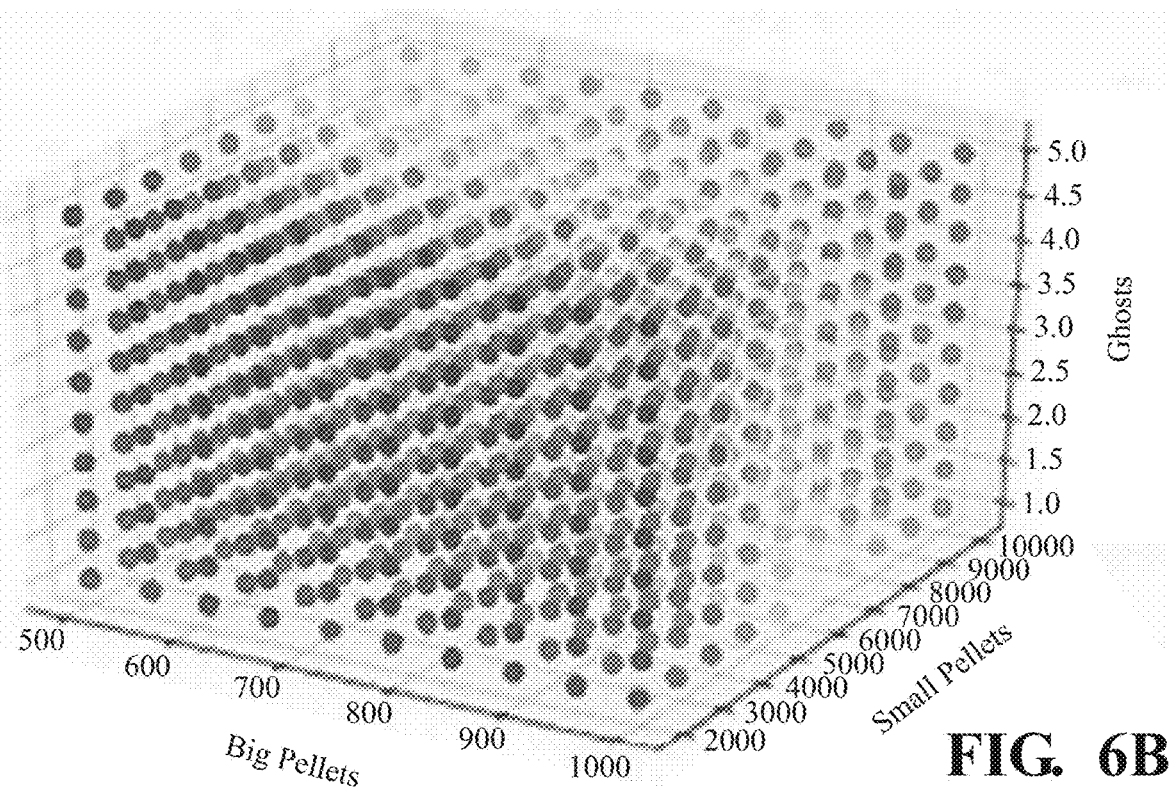
Figure 6C:
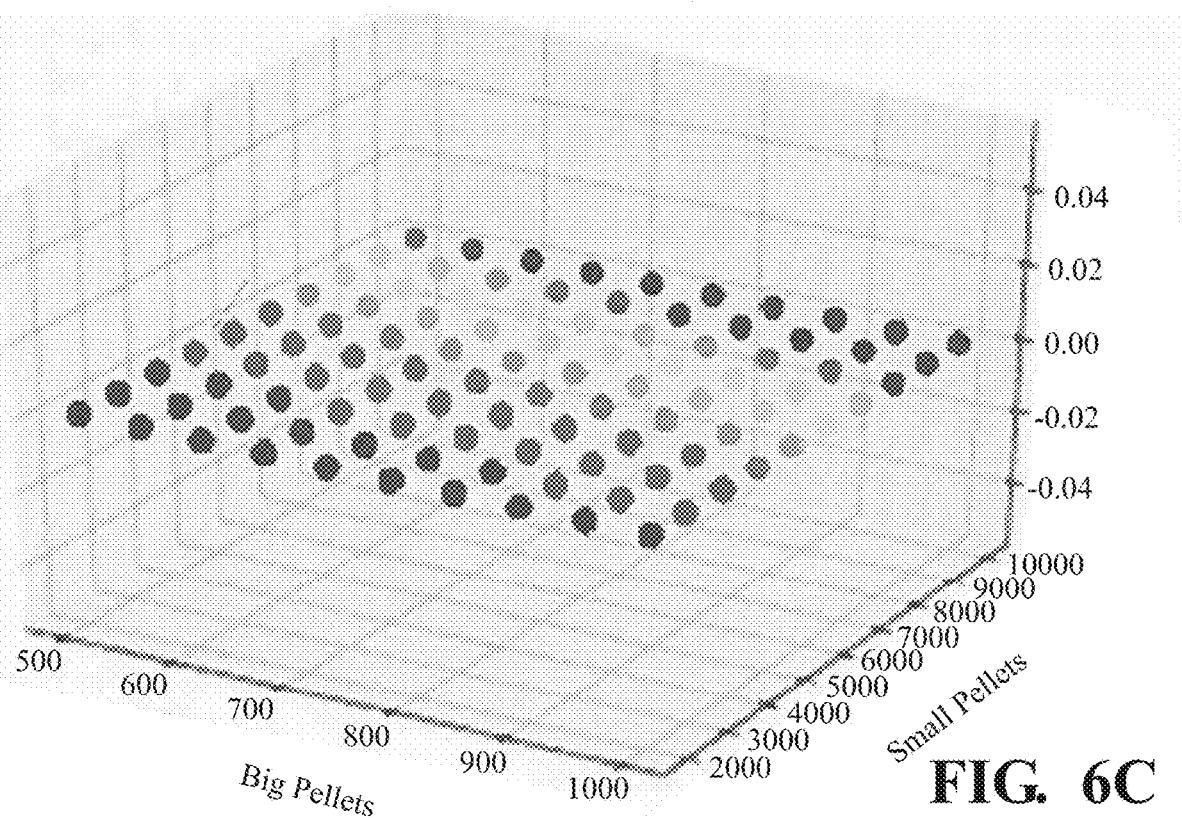

For example, referring to FIGS. 6A-6C, the N-dimensional potential field can be used by an AI system that seeks to achieve a high score on a videogame. Moreover, FIG. 6A illustrates the Pac-Man video game. The Pac-Man video game awards points shown as a high score 96 based on the movement and acquisition of pellets and/or ghosts as indicated by element 98. FIG. 6B illustrates a three-dimensional potential field image that illustrates points awarded for consuming big pellets, small pellets, and ghosts. FIG. 6C illustrates a two-dimensional potential field that illustrates points awarded to consuming big pellets and small pellets. This type of potential field image could be utilized by an AI system to play the Pac-Man game with the target is achieving the highest possible score.

Figure 7A:
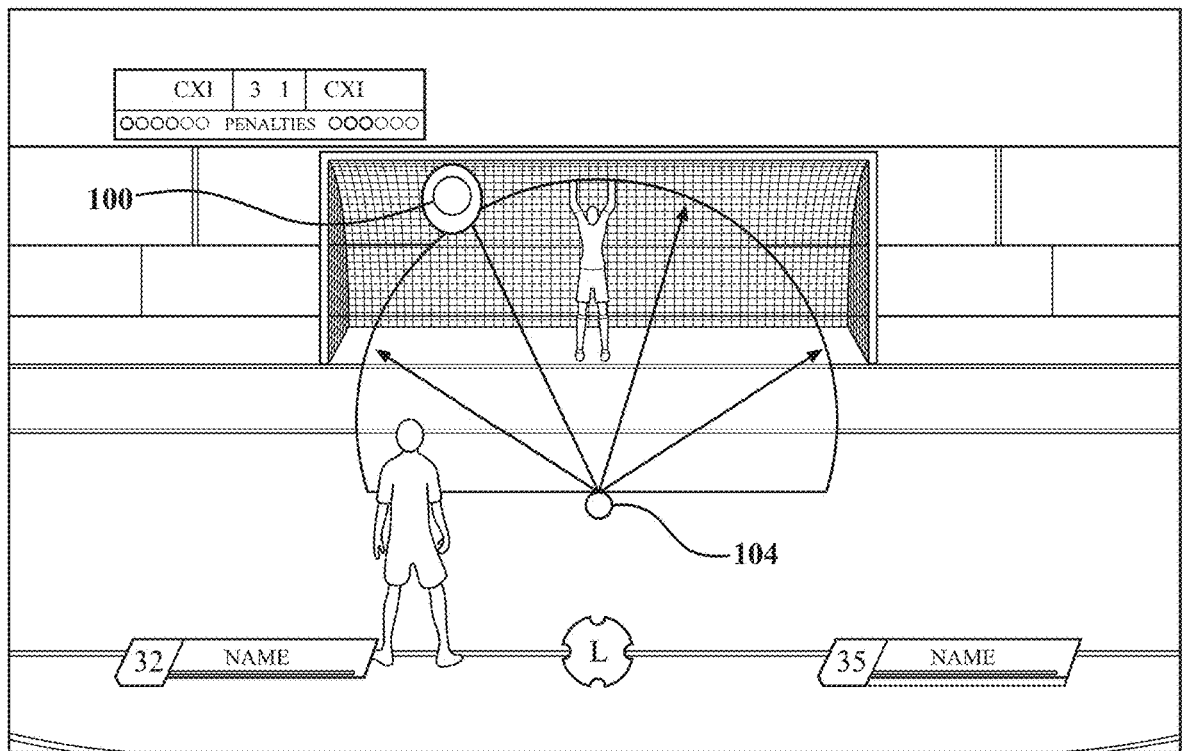
FIGS. 7A and 7B illustrate a potential field image utilized in a sports type videogame that utilizes scoring a goal is a target.
Figure 7B:
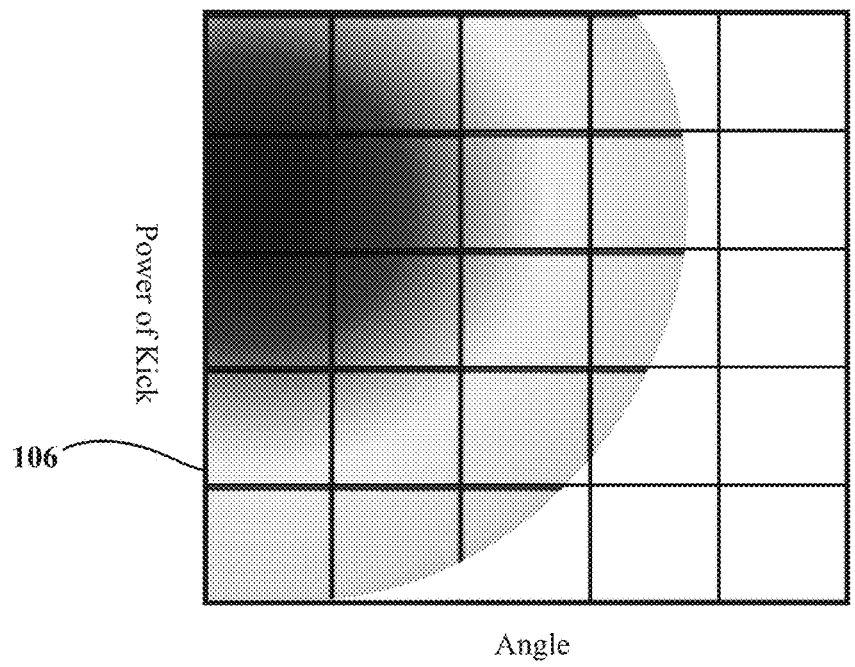

In another example, FIG. 7A illustrates a soccer videogame, wherein the target 100 is a specific location on the screen 102. The current position is represented by the soccer ball 104. FIG. 7B illustrates a two-dimensional potential field 106 that considers the power of the kick of the soccer ball and the angle of the kick with regards to kicking the ball towards the target 100. An AI system would utilize this potential field image to kick the soccer ball 104 with a power and at an angle that has the highest color intensity values.

Figure 8A:
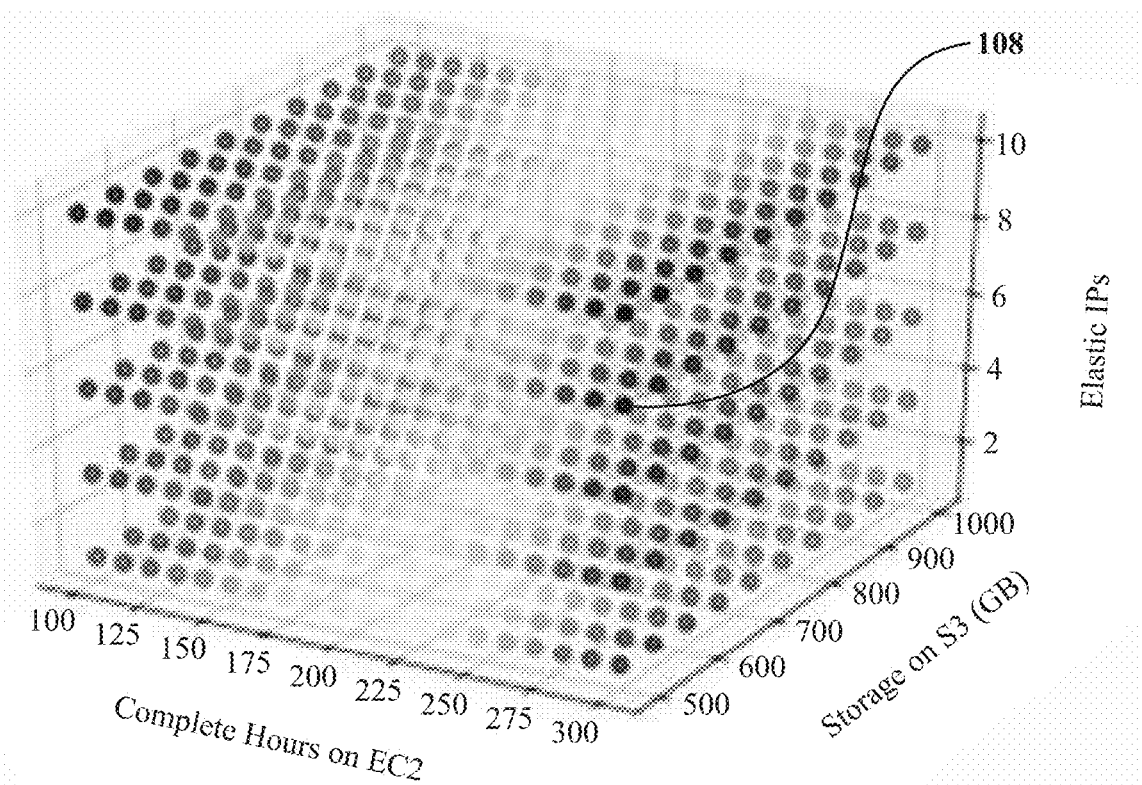
FIGS. 8A and 8B illustrate a potential field image utilized in a financial system that utilizes a budget as a target.
Figure 8B:
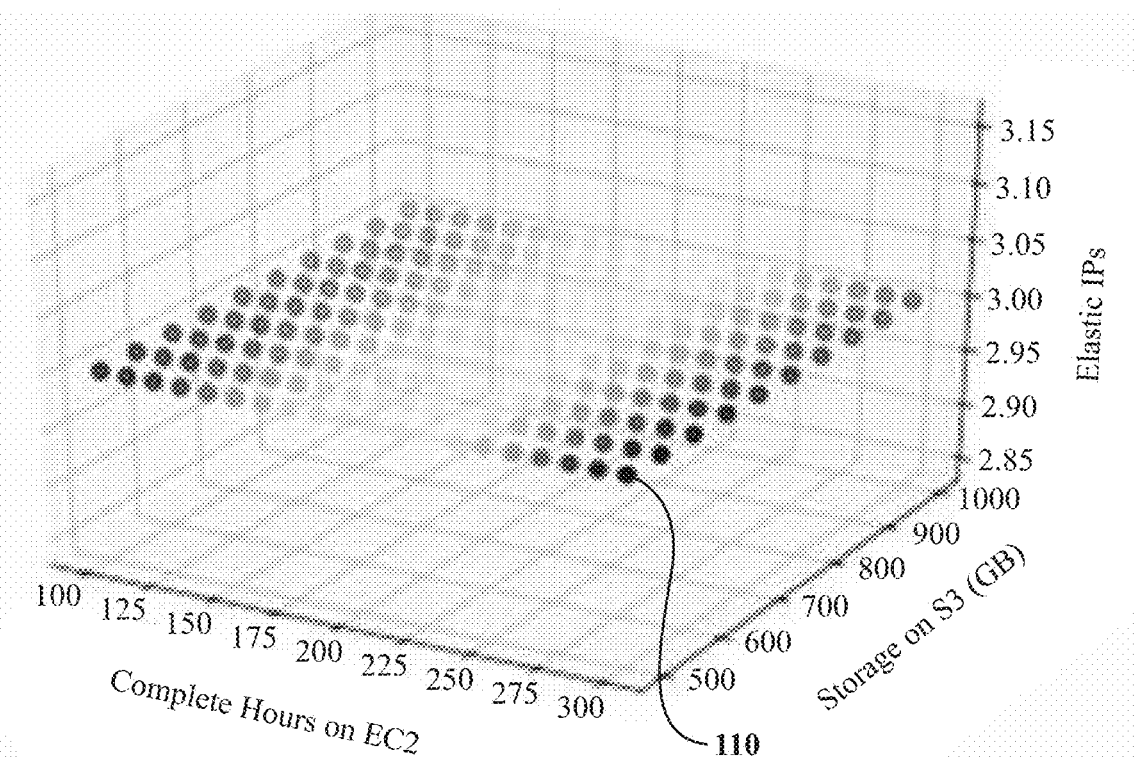

As stated before, the use of a potential field image can be used in a variety of applications. These applications are not merely limited to controlling autonomous vehicles or playing video games but could also apply to financial targets as well. For example, FIG. 8A illustrates an example of a cloud computing services provider, such as Amazon Web Services. Here, the target could be a monthly budget. The dimensions utilized in the potential field image could be costs related to storage, computational requirements, and elastic IP addresses. The color intensity of the potential field image of FIG. 8A can reveal the most optimum combination considering of all three variables. FIG. 8B illustrates a different outcome 110 when one fixes the number of elastic IP's required to three. Either way, an AI system can utilize the AFP image to best utilize resources to meet the target budget. It should be understood that the potential field image, in this example or otherwise, can be used for visualization reasons and does not necessarily need to be provided to an artificial intelligence engine.

Figure 9:
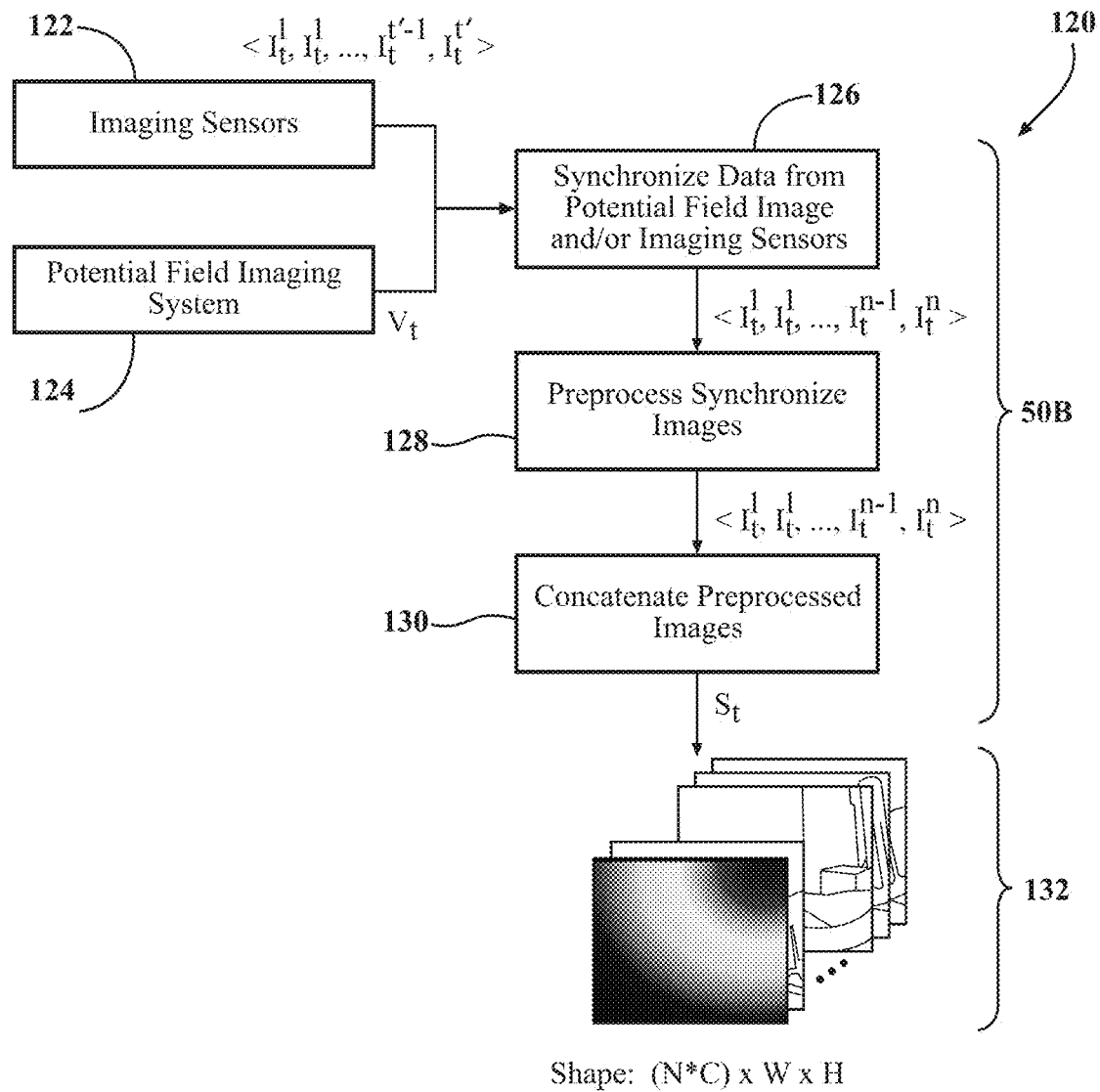
FIG. 9 illustrates a flow chart for artificial intelligence system for an autonomous vehicle that may utilize a potential field image.

FIG. 9 illustrates a flow chart for artificial intelligence system 120 for an autonomous vehicle that may utilize a potential field image. The artificial intelligence system 120 and any associated method may be stored on the memory device 42 as a target-orientated navigation system module 51 of FIG. 2. The artificial intelligence system 120 and/or method may operate without the use of a potential field image. Here, the artificial intelligence system 120 may receive data 122 from one or more imaging sensors in the form of imaging data. The imaging sensors may include the sensors 14, 20, 22, 24 and/or 26 shown and described in FIG. 2. The artificial intelligence system 120 may also receive data 124 from a potential field imaging system. The potential field imaging system is configured to produce a potential field image as described in the paragraphs above. As mentioned previously, the artificial intelligence system 120 may only use the data 122 from the imaging sensors and may not use the data 124 from the potential field imaging system. The steps 126, 128, and/or 130 may be stored as instructions as an input state array generation module 50B that is executed by the one or more processors of FIG. 2.

At block 126, the data 122 from the imaging sensors and/or data 124 from the potential field imaging system is synchronized. The data 122 and/or 124 contains timestamp information. The data is synchronized based on a comparison between the timestamps of the data 122 and/or 124. The data 122 and/or 124 are combined and synchronized based on the timestamp information, to organize data based on the time the data was captured. For example, the different imaging sensors produce raw images at different rates and the potential field imaging system produces the potential field image at a different rate. The synchronization is done for the timestamp at which potential field image is created, whereby, from each imaging sensor, only the image created closest to the latest potential field image is retained and the rest are discarded. This step will result in N time synchronized images.

At block 128, the synchronized data, which may be a collection of images, is preprocessed into a common data format. Moreover, synchronized N images produced by different sources are of different sizes and may have a different number of color channels. During this step, the synchronized N images are reshaped into a common image resolution of Width-by-Height (W×H) and transformed into a common color-space which results in C channels. The W, H and C are arbitrary hyper-parameters and can be modified depending on the need. This step will result in N time synchronized images of common image dimensions of W×H×C.

At block 130, the preprocessed data is concatenated data into a K-dimensional array, wherein the K-dimensional array is an input state array ($s_t$) 132. the N synchronized and preprocessed images are concatenated into an input state array ($s_t$) 132 of dimension (N*C)×W×H. This concatenated input state array ($s_t$) 132, which a Navigation Policy ($\pi$) (later described in this specification), will use to compute a sub-target point ($t_t'$).

Figure 10:
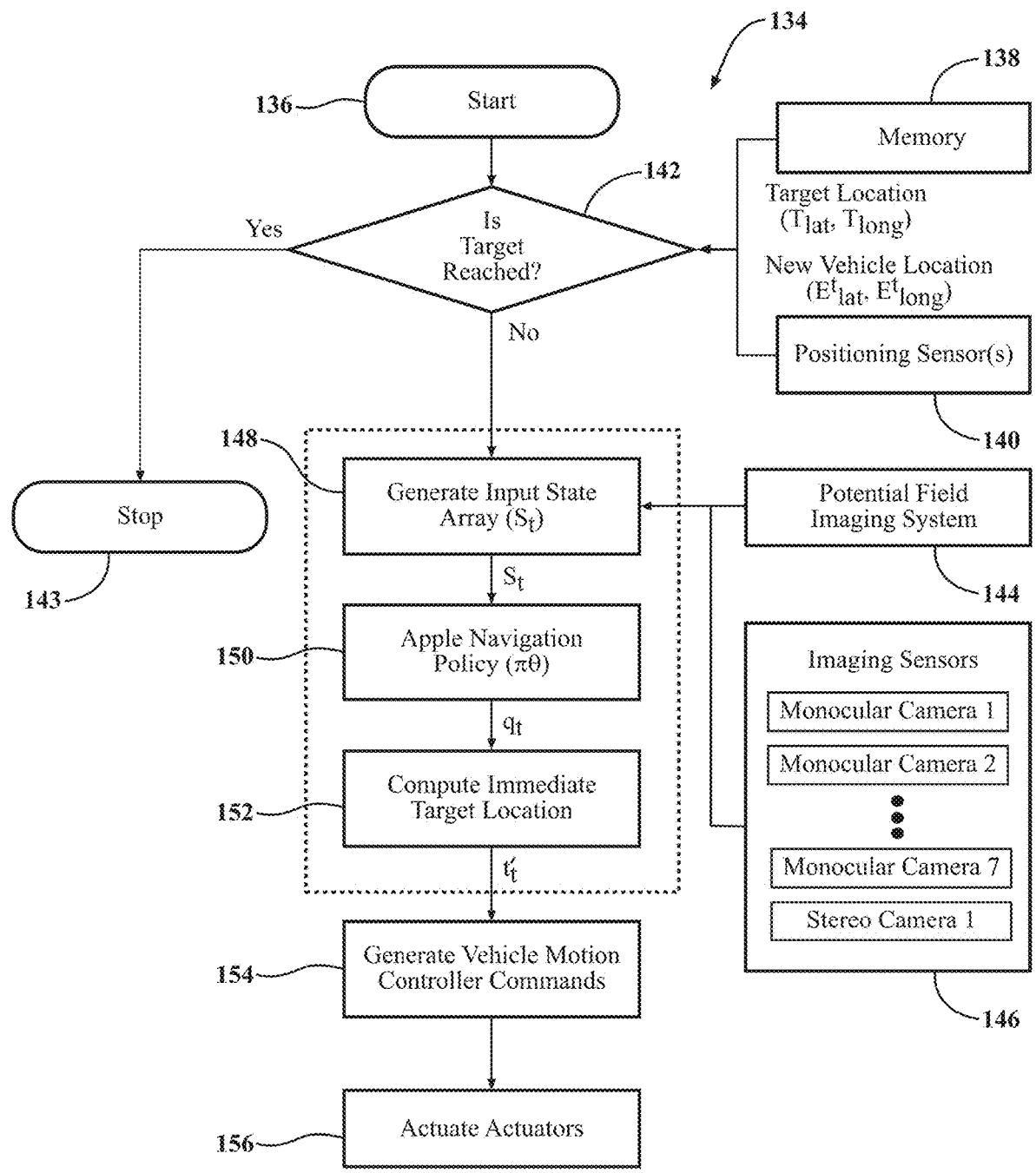
FIG. 10 illustrates a flow chart of an artificial intelligence system that utilizes an input state array.

Referring to FIG. 10, a method 134 that utilizes the input state array ($s_t$) 132 is shown. The method 134 may be stored on the memory device 42 as part of the target-orientated navigation system module 51 of FIG. 2. The method begins at step 136. The method 134 accesses information from the memory 138, which may be the memory device 42 of FIG. 2 as well as information from positioning sensors 140, which could be sensors 14, 20, 22, 24 and/or 26 and/or information from the GNSS system 28, also of FIG. 2.

At step 142, a determination is made if the target is reached. This determination may be made by comparing the target location from the memory 138 with the vehicle location from the positioning sensors 140. If the target location and the vehicle location are similar, a determination may be made that the target has been reached and the method ends, as indicated in step 143.

If the target has not yet been reached, the method will proceed to step 148. Step 148 generates the input state array ($s_t$), which was previously described in the paragraphs above and shown in FIG. 9. As stated before, the input state array ($s_t$) may be generated by utilizing information from the potential field imaging system 144 and/or imaging sensors 146, which as stated previously may include sensors 14, 20, 22, 24, and/or 26.

Once the input state array ($s_t$) has been generated, a navigation policy ($\pi$) is applied to the input state array ($s_t$), as indicated in step 150. As will be described in further detail later, the navigation policy ($\pi$) utilizes the input state array ($s_t$) to generate an action-value array ($q_t$) which represents a plane in front of the vehicle. The cells of the action-value array ($q_t$) contain an expected long-term reward value of driving the vehicle towards the corresponding cell. The values of the action-value array ($q_t$) are representative of the distance between the vehicle and the target that the vehicle intends to reach and the distance between the vehicle and one or more objects that the vehicle does not wish to collide with.

In step 152, based on the output of the navigation policy in response to the input state array ($s_t$), the method 134 computes an immediate target location ($t_t'$), sometimes referred to as a sub-target point. The immediate target location ($t_t'$) is representative of a location that the vehicle wishes to travel to in the immediate future. The navigation policy ($\pi$) maps the input state array ($s_t$) to the immediate target location ($t_t'$), in front of the vehicle using the pre-trained navigation policy ($\pi$).

$$\pi : s_t \rightarrow t_t'$$

The navigation policy ($\pi$) that drives the sub-target computation is generated using a machine learning approach called reinforcement learning ("RL")

In step 154, commands to the vehicle motion controllers are generated based on the location that the vehicle wishes to travel to and in step 156, the actuation system of the vehicle pilots the vehicle to the desired location. The actuation system could include actuators 44, 46, and/or 48 of FIG. 2.

The purpose of the RL framework while training a module (often referred to as 'agent') is to map the current observation ($S_t$) in an environment ($\xi$) to the best possible action ($a_t$) that can be taken. An action could be a discrete choice (e.g., 1: 'move left' or 2: 'move right') or continuous value (e.g., acceleration and steering angle). The mapping from state to action is done based on the navigation policy ($\pi$). For executing the action ($a_t$), the module receives a reward signal ($r_t \in R$), a real-valued number. A reward signal can be designed based on the objective of the module (e.g., distance to the target location, reward increases if the action moves the vehicle closer to the target location). Based on the executed action, the environment will move to a new state $S_{t+1}$ producing the following Markov Sequence.

$$S_{t=0}, a_{t=0}, r_{t=0}, S_{t=1}, a_{t=1}, \ldots S_{t=n}$$

The training sequence ends when the desired goal is achieved or when an action results in a termination (e.g., driving out of bounds) at which point the learning restarts with a new beginning state, $S_{t=0}$. One such sequence from start to end may be referred to as an 'episode.'

The choice of action for the state is informed by a Value Function ($V_\pi$) which represents the "expected value (E)" of "finite-long-term discounted reward ($R_t$)" for taking the action $a_t$ for state $S_t$ using the current navigation policy $\pi$.

$$V_\pi = E[R_t | S_t, a_t, \pi]$$

$$R_t = \Sigma_{t'=0 \rightarrow h}(\gamma^{t'} * r_{t+h}), \gamma\text{—discount factor \& h—finite horizon}$$

$$a_t = \max_{a' \in A} V_\pi(S_t, a')$$

The goal of a module in RL is to come up with the most accurate mapping of $S_t$ to $a_t$, i.e., accurately predict the value of all possible actions so that the action with maximum value can be executed and high reward can be received as a result of it. This may be achieved by constantly updating the navigation policy, at $\pi_t \rightarrow \pi_{t+1}$. By training over several episodes, an optimal policy ($\pi^*$) is attained. There are several RL algorithms which can be used to train the module within this framework.

Figure 11A:
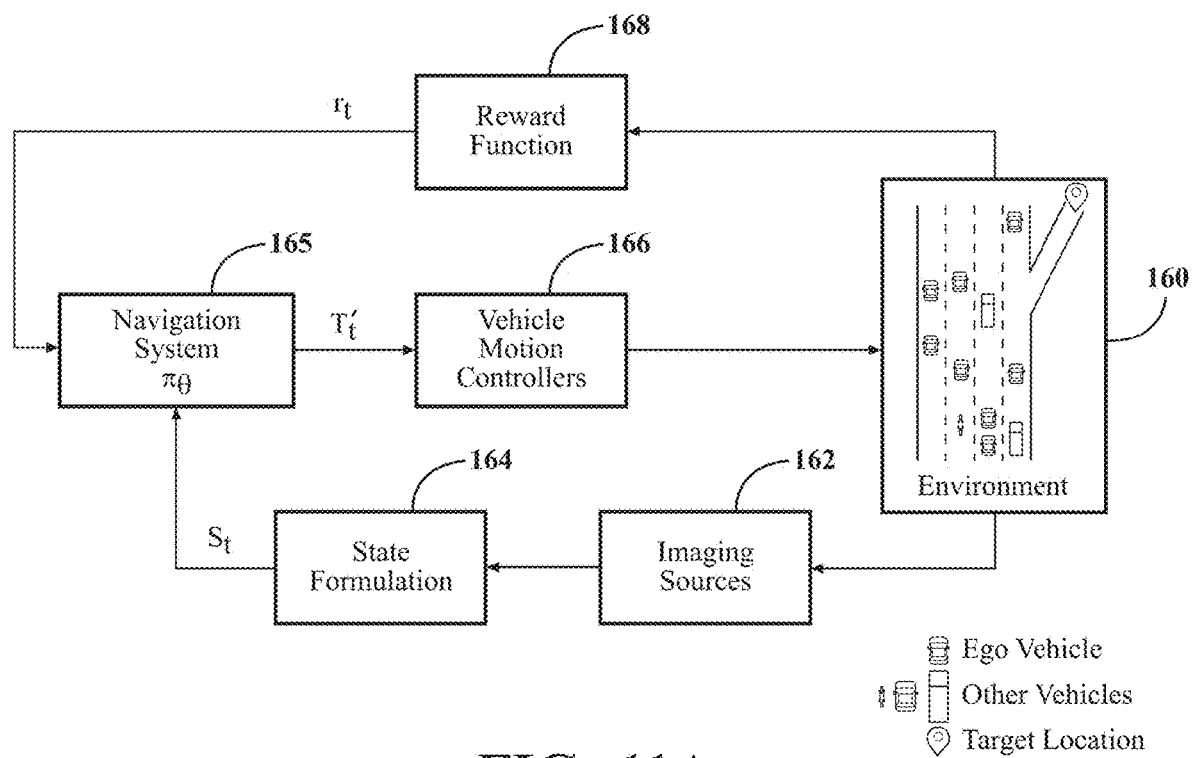
FIGS. 11A and 11B illustrate a general overview of training a navigation policy for the artificial intelligence system for an autonomous vehicle of FIG. 9 using reinforcement learning.

Referring to FIG. 11A, one example regarding the general framing of RL for a vehicle navigation module is shown. Here, this figure illustrates that the input state array ($s_t$) is generated by using one or more imaging sources 162 and by a state formulation block 164. The one or more imaging sources 162 can be the one or more sensors 14, 20, 22, 24 and/or 26 shown described in FIG. 2. The imaging sources 162 can capture images from the environment 160. From there, the current observation ($S_t$), as previously described, is generated in state formulation block 164.

The current observation ($S_t$) is then provided to the navigation system 165 which contains the navigation policy ($\pi$). From there, as shown by block 166, the vehicle motion controllers are actuated based on the output received from the navigation system 165. Thereafter, the vehicle then moves in the environment 160 as instructed.

Figure 11B:
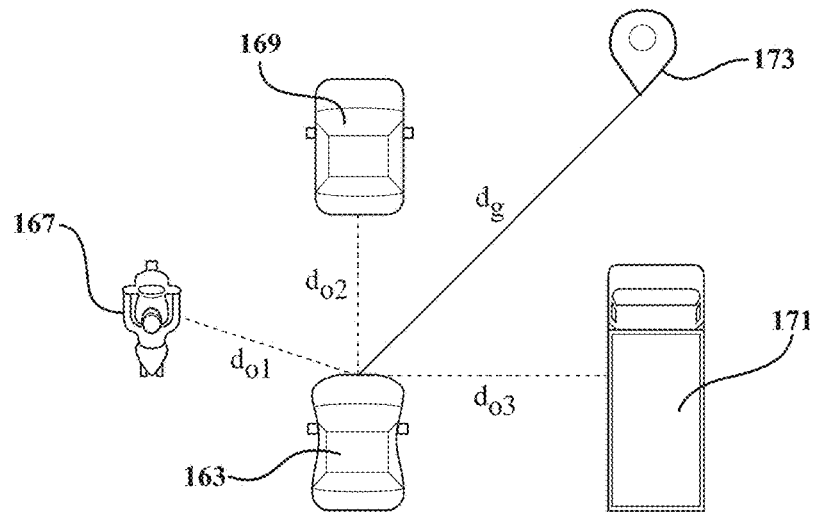

As best shown in FIG. 11B, the reward function of block 168 may be defined by a combination of distance to the target location ($d_g$) and distance ($d_{o1, 2, 3}$) to the objects 167, 169, 171 surrounding the ego vehicle 163 whereby higher will be the reward, the closer it is to the target location 173 and farther it to the nearby objects.

$$r_t = f(d_t, d_o)$$

Any type of RL algorithm—both regular and Deep RL variants—can be used to train the optimal navigation policy using the framework described above.

In one implementation, model-based reinforcement algorithms can be used to train the navigation policy ($\pi$). In certain high-end AD vehicles with more deterministic mechanics and operating on a set of pre-planned well-maintained roads, where it is easier to learn both the vehicle and motion dynamics, transition probabilities for executing an action can be studied. In those cases, model-based RL algorithms such as Model-Based Value Expansion ("MBVE") can be used.

In other less deterministic generic cases such as an autonomous vehicle operating on non-pre-planned routes, model-free RL algorithms with both on-policy and off-policy implementations can be used. Furthermore, the action-value ($V_\pi$) prediction could be trained through both value iteration and policy iteration methods. Examples of such algorithms are Q-learning, PPO, A3C, and DDPG. This example uses, a Model-Free, Off-Policy, Value Iteration trained Deep RL algorithm called Deep Q Networks ("DQN").

The DQN implementation in this example uses a Fully Convolutional Deep Neural Network ("FC-DNN") to map the State, $S_t$ to Action Space A. The FC-DNN, by training over many episodes is trained to predict the accurate Q values (referred as $V_\pi$, before), of all the cells in the M×M grid at K m in front of the vehicle. The lattice with the highest Q value at every iteration is the target lattice ($l_t$), and the sub-target point ($T_t'$) is computed using a pre-computed transformation matrix.

The navigation policy ($\pi$) can be trained completely in a virtual simulation world emulating reality as close as possible or by a combination of simulation and real-world data. The architecture of the Deep Neural Network ("DNN") used in DQN is arbitrary. A simple DNN or a convolutional neural network ("CNN") can replace the FC-DNN used in this model. In certain implementations, a combination of FCDNN-LSTM can be used where lattice choices of previous time-steps are fed-back as input for the current time-step to get smoother navigation. In another implementation, Temporal CNN ("tCNN") can be used which achieves the precious states instead of actions to train the current timestep.

Also, the shapes of input and output layer of the DNN depends on the size of the State, (N*C)×W×H and lattice, M×M. This example uses a modified VGG-16 architecture with (2*3)×224×224 as input shape and 41×41 for lattice shape.

Figure 12A:
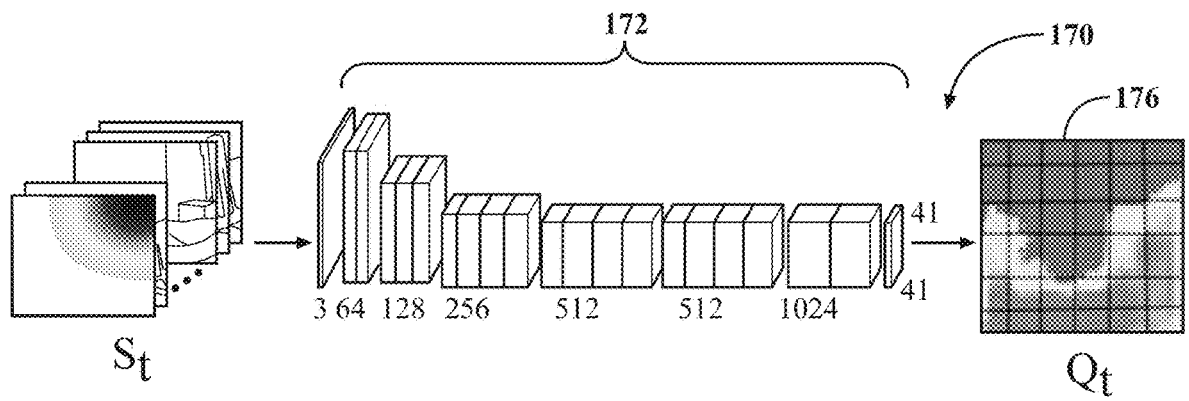
FIGS. 12A-12C illustrate one example of an autonomous vehicle utilizing the artificial intelligence system and method to reach a target.

Referring to FIG. 12A, a general overview 170 of the input and output functionality of the navigation policy ($\pi$) 172 is shown. These functions may form part of an action-value array generation module 50C of FIG. 2 and may be executed by the one or more processor 40 to cause the one or more processors 40 to perform the described actions.

The navigation policy ($\pi$) 172, as described in the previous paragraphs, may be trained through reinforcement learning to account for predefined navigation constraints in order to provide a desired navigation action. The input to the navigation policy ($\pi$) 172 is the input state array ($s_t$) 174. As stated before the input state array ($s_t$) 174 may be comprised of concatenated and transform sensor data. In addition, or in the alternative, the input state array ($s_t$) 174 may include a potential field image, described previously in this detailed description section.

The navigation policy ($\pi$) 172 applies several deep learning algorithms, as described in the previous paragraphs to the input state array ($s_t$) 174. The output is in the form of an action-value array ($q_t$) 176.

Figure 12B:
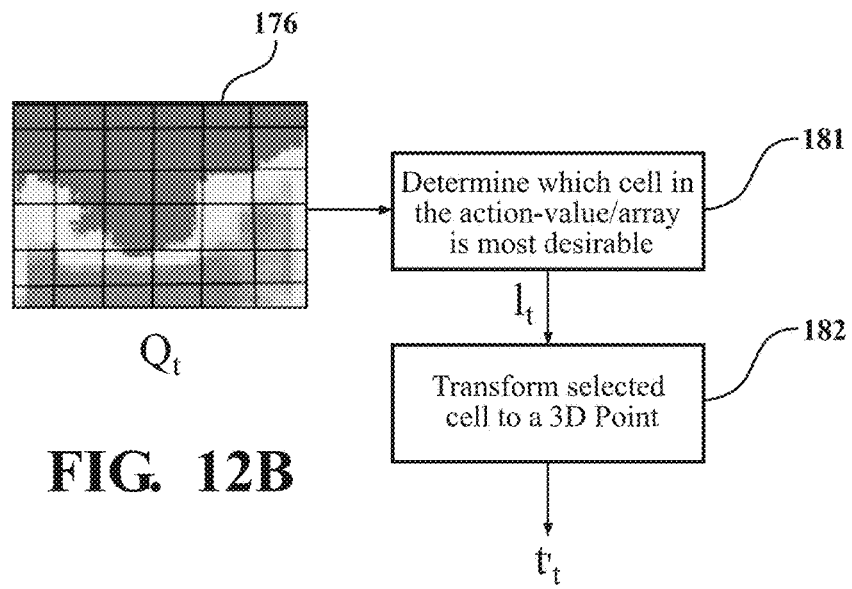
Figure 12C:
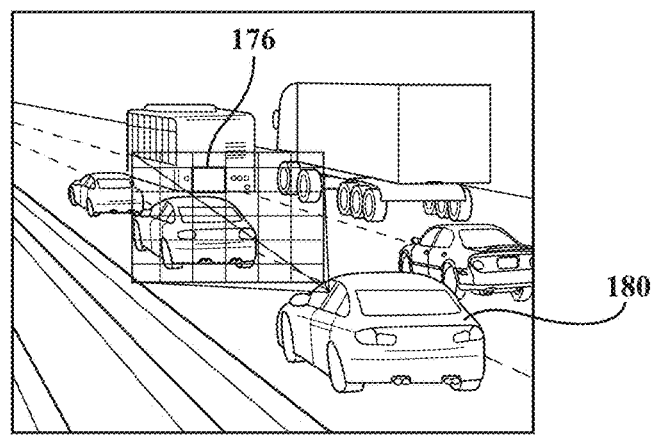

As best shown in FIGS. 12B and 12C, the action-value array ($q_t$) 176 may be a two-dimensional plane in front of a vehicle 180. The cells of the action-value array ($q_t$) 176 may contain an expected long-term reward value of driving the vehicle 180 towards the corresponding cell. The values of the action-value array ($q_t$) 176 being representative of a distance between the vehicle 180 and a target the vehicle intends to reach and a distance between the vehicle and one or more objects the vehicle wishes to avoid.

As best shown in FIG. 12B, in block 181, the one or more processors 40 of FIG. 2 may determine which cell in the action-value array ($q_t$) 176 have the more desirable value that represents a more favorable reward function. In some cases, a higher value may be indicative of a more favorable reward function. In other instances, a lower value may be indicative of a more favorable reward function.

In block 182, the one or more processors 40 of FIG. 2 may transform the cell in the action-value array ($q_t$) 176 that the vehicle wishes to travel to into a three-dimensional point $t_t'$ which is a way-point immediately in front of the vehicle 180. From there, the one or more processors 40 of FIG. 2 may then direct the appropriate vehicle actuators 44, 46 and/48 to pilot the vehicle towards three-dimensional point. These steps 181 and 182 may form part of a direction module 50D of FIG. 2 and may be executed by the one or more processor 40 to cause the one or more processors 40 to perform the described actions.

Figure 13A:
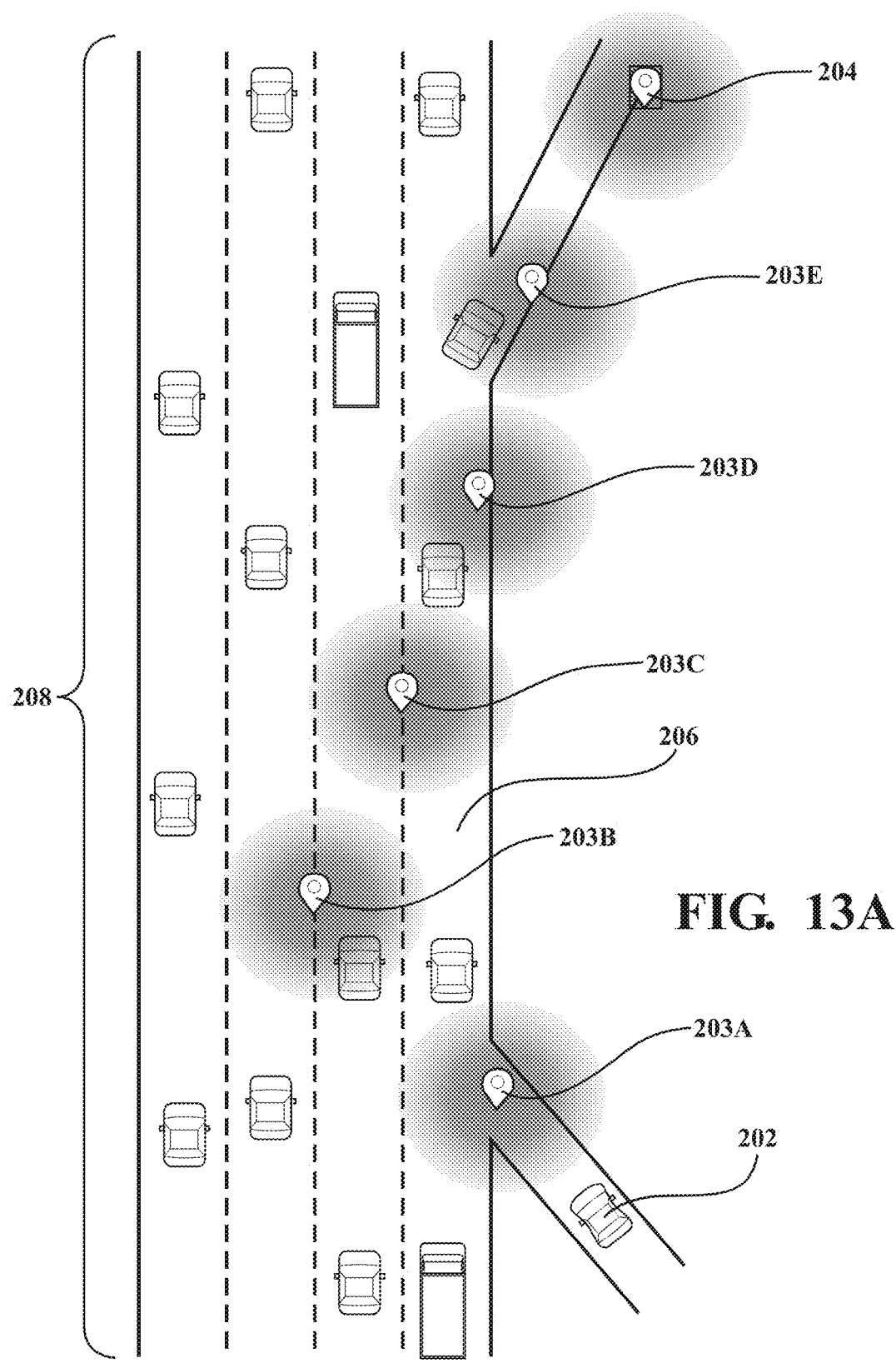
FIGS. 13A and 13B illustrate one example of an autonomous vehicle utilizing the artificial intelligence system and method to reach a target by utilizing one or more intermediate targets.
Figure 13B:
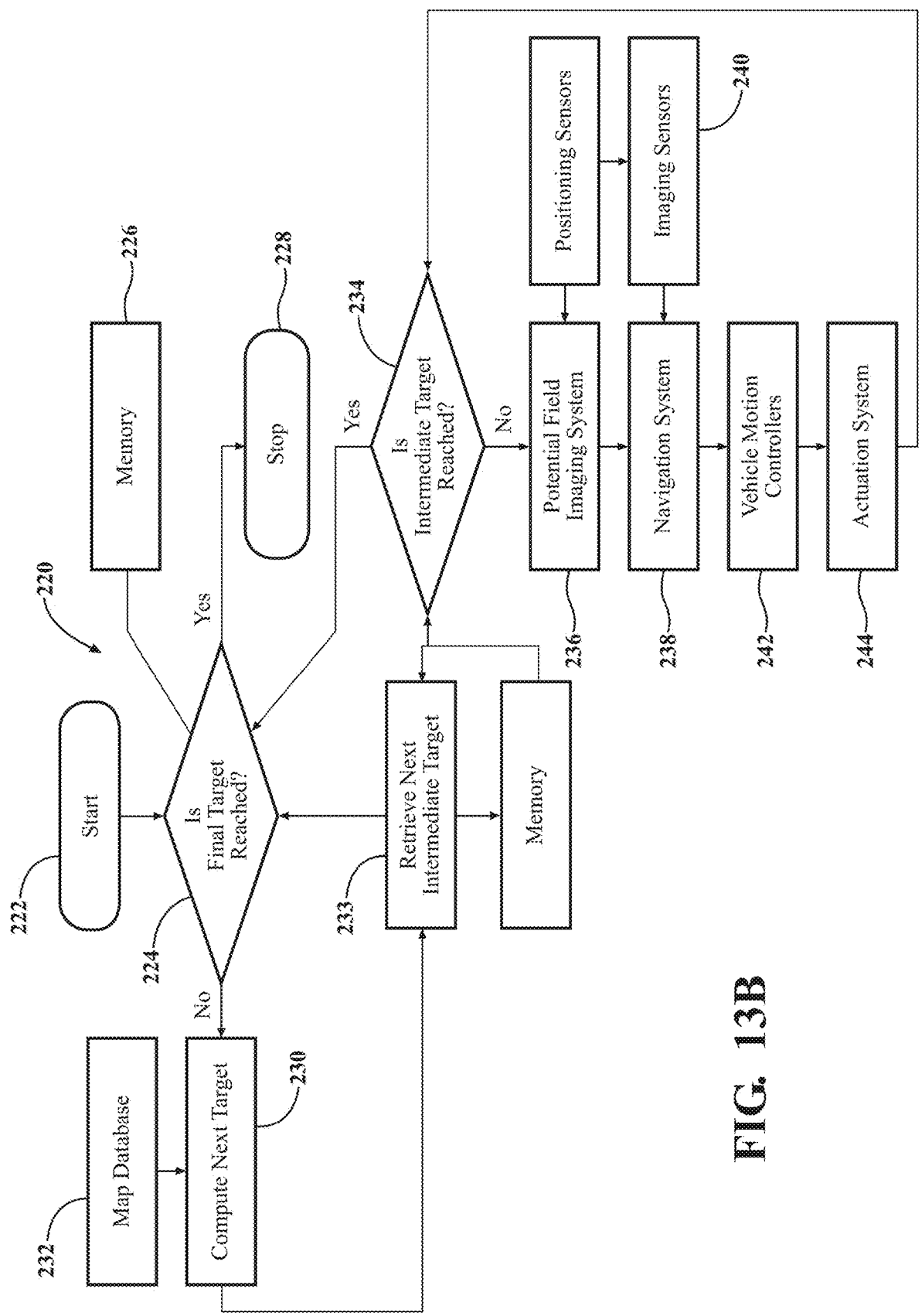

Referring to FIGS. 13A and 13B, one example of a vehicle 202 incorporating the artificial intelligence system to reach a final target 204 and associated method 220 are shown. These functions may form part of the target-orientated navigation system module 51 of FIG. 2 and may be executed by the one or more processor 40.

As a general overview, the vehicle 202 wishes to travel on a road 206 to reach a final target 204. The road 206 is populated with one or more objects 208 in the form of other vehicles. Ultimately, the vehicle 202 desires to reach the final target 204 without colliding with any objects 208 located on the road 206. In order to reach the final target 204, the vehicle 202 is directed to a series of intermediate targets 203A-203E that the vehicle 202 must first reach before reaching the final target 204.

The methodology for reaching the final target 204 by the intermediate targets 203A-203E is shown in the method 220. These methods 220 may form part of the target-orientated navigation system module 51 of FIG. 2 and may be executed by the one or more processor 40.

The method 220 starts in block 222. At step 224, a determination is made if the vehicle 202 has approached the final target 204. The determination at step 224 is made by possibly reviewing information in the memory 226 of the vehicle 202. This memory could contain information regarding the current position of the vehicle 202. If the current position of the vehicle 202 matches the final target 204, then the final target has been reached and the method ends as indicated in step 228.

However, if the final target is not reached, the method 220 computes a next target as indicated in step 230. The next target may be computed by using a map database 232 found on the vehicle navigation system previously shown described in FIG. 2. In block 233, the method 220 retrieves the next intermediate target information. From there, a determination is made in step 234 if the intermediate target has been reached. If the intermediate target has been reached, then the method 220 returns to step 224 where a determination will be made if the final target is reached.

If the intermediate target has not been reached, the method 220 may receive a potential field image from a potential field imaging system as indicated in step 236. In step 238, the navigation system may utilize information from imaging sensors 240 and/or the potential field imaging system from step 236 to determine which vehicle motion controllers should be actuated as shown in step 242. In step 244, the actuation system actuates the appropriate vehicle controllers to move the vehicle towards the intermediate target.

The method then returns to step 234, where a determination will be made if the intermediate target has been reached. If it has, the method 220 then goes to step 224 where a determination will be made if the final target has been reached. In this example, because there are five intermediate targets to be reached before reaching the final target 204, it will be assumed that the methodology will have to first determine if the vehicle has reached five separate intermediate targets before finally reaching an intermediate target that is considered the final target so as to satisfy step 224 of the method 220.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer readable program code embodied, e.g., stored, thereon. Any combination of one or more computer-readable media may be utilized. The computer-readable medium may be a computer readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An artificial intelligence system for an autonomous vehicle, the autonomous vehicle comprising:
   one or more processors;
   a memory in communication with the one or more processors and storing:
      an input state array generation module when executed by the one or more processors cause the one or more processors to receive sensor data from one or more sensors of a vehicle, the sensor data having a time stamp, synchronize the sensor data to generate synchronized sensor data, wherein the sensor data are synchronized based on a comparison between the time stamps of the sensor data, preprocess the synchronized sensor data by transforming the sensor data into transformed sensor data having a common data format, and concatenate the transformed sensor data into a K-dimensional array, wherein the K-dimensional array is an input state array;
      an action-value array generation module when executed by the one or more processors cause the one or more processors to apply a navigation policy to the input state array to estimate an action-value array having a plurality of cells, wherein the navigation policy was trained through reinforcement learning to account for predefined navigational constraints in order to provide a desired navigational action, the action-value array being an array representing a plane in front of the vehicle, wherein the plurality of cells of the action-value array contains an expected long term reward value of driving the vehicle towards a corresponding cell, values of the plurality of cells of the action-value array being representative of a distance between the vehicle and a target the vehicle intends to reach and a distance between the vehicle and one or more objects the vehicle wants to avoid; and
      a direction module when executed by the one or more processors cause the one or more processors to direct a vehicle control system to guide the vehicle to a location representative of a cell in the action-value array that has a highest reward value.

2. The artificial intelligence system for the autonomous vehicle of claim 1, wherein the action-value array is estimated using a deep neural network.

3. The artificial intelligence system for the autonomous vehicle of claim 1, wherein the target comprises a final target and one or more intermediate targets, the intermediate targets being located between the final target and the vehicle.

4. The artificial intelligence system for the autonomous vehicle of claim 1, wherein the one or more sensors include at least one of: a monocular camera, a stereo camera, a radar system, and ultrasonic radar system, or a light detection and ranging system.

5. The artificial intelligence system for the autonomous vehicle of claim 1, wherein the memory in communication with the one or more processors stores:
   an artificial intelligence potential field imaging module when executed by the one or more processors cause the one or more processors to receive an origin value representing a current position and a destination value representing a target position, discretize an N-dimensional space having a plurality of cells around the current position, compute potential values for the cells of the plurality of cells as a function of a proximity of the current position from the target position, and compute an N-dimensional potential field array, wherein values for the cells of the N-dimensional potential field array being based on the potential value of a corresponding cell from the N-dimensional space, wherein the N-dimensional potential field array is provided a time stamp; and
   the input state array generation module when executed by the one or more processors further cause the one or more processors to synchronize the sensor data and the N-dimensional potential field array, wherein the sensor data and the N-dimensional potential field array are synchronized based on a comparison between the time stamps of the sensor data and the N-dimensional potential field array, preprocess the synchronized sensor data and the N-dimensional potential field array by transforming the sensor data and the N-dimensional potential field array into a common data format, and concatenate the transformed sensor data and the N-dimensional potential field array into a K-dimensional array, wherein the K-dimensional array is the input state array.

6. The artificial intelligence system for the autonomous vehicle of claim 5, wherein the origin value and the destination value are represented as coordinates of from a Global Navigation Satellite System.

7. The artificial intelligence system for the autonomous vehicle of claim 5, wherein the origin value represents a current vehicle position of a vehicle and the destination value represents an intended vehicle destination position of the vehicle.

8. A method for operating an autonomous vehicle, the method comprising the steps of:
receiving sensor data from one or more sensors of the autonomous vehicle, the sensor data having a time stamp;
synchronizing the sensor data, wherein the sensor data are synchronized based on a comparison between the time stamps of the sensor data;
preprocessing the synchronized sensor data by transforming the sensor data into transformed sensor data having a common data format;
concatenating the transformed sensor data into a K-dimensional array, wherein the K-dimensional array is an input state array;
applying a navigation policy to the input state array to estimate an action-value array having a plurality of cells, wherein the navigation policy was trained through reinforcement learning to account for pre-defined navigational constraints in order to provide a desired navigational action;
the action-value array being an array representing a plane in front of the autonomous vehicle, wherein the plurality of cells of the action-value array contains an expected long term reward value of driving the autonomous vehicle towards a corresponding cell, values of the plurality of cells of the action-value array being representative of a distance between the autonomous vehicle and a target the autonomous vehicle intends to reach and a distance between the autonomous vehicle and one or more objects the autonomous vehicle wants to avoid; and
directing a vehicle control system to guide the autonomous vehicle to a location representative of a cell in the action-value array that has a highest reward value.

9. The method for operating an autonomous vehicle of claim 8, further comprising the step of estimating the action-value array using a deep neural network.

10. The method for operating an autonomous vehicle of claim 8, wherein the target comprises a final target and one or more intermediate targets, the intermediate targets being located between the final target and the autonomous vehicle.

11. The method for operating an autonomous vehicle of claim 8, wherein the one or more sensors include at least one of: a monocular camera, a stereo camera, a radar system, and ultrasonic radar system, or a light detection and ranging system.

12. The method for operating an autonomous vehicle of claim 8, further comprising the steps of:
receiving an origin value representing a current position and a destination value representing a target position,
discretizing an N-dimensional space having a plurality of cells around the current position;
computing potential values for the cells of the plurality of cells as a function of a proximity of the current position from the target position;
computing an N-dimensional potential field array, wherein values for the cells of the N-dimensional potential field array being based on the potential value of a corresponding cell from the N-dimensional space, wherein the N-dimensional potential field array is provided a time stamp;
synchronizing the sensor data and the N-dimensional potential field array, wherein the sensor data and the N-dimensional potential field array are synchronized based on a comparison between the time stamps of the sensor data and the N-dimensional potential field array;
preprocessing the synchronized sensor data and the N-dimensional potential field array by transforming the sensor data and the N-dimensional potential field array into a common data format; and
concatenating the transformed sensor data and the N-dimensional potential field array into a K-dimensional array, wherein the K-dimensional array is the input state array.

13. The method for operating an autonomous vehicle of claim 12, wherein the origin value and the destination value are represented as coordinates of from a Global Navigation Satellite System.

14. The method for operating an autonomous vehicle of claim 12, wherein the origin value represents a current vehicle position of a vehicle and the destination value represents an intended vehicle destination position of the vehicle.

15. A target orientated artificial intelligence system comprising:
one or more processors;
a memory in communication with the one or more processors, the memory storing an artificial intelligence potential field imaging module; and
the artificial intelligence potential field imaging module when executed by the one or more processors cause the one or more processors to receive an origin value representing a current position and a destination value representing a target position, discretize an N-dimensional potential field array having a plurality of cells around the current position, compute potential values for the cells of the plurality of cells of the N-dimensional potential field array as a function of a proximity of the current position from the target position, and produce an N-dimensional potential field image based on the N-dimensional potential field array, the N-dimensional potential field image having pixels corresponding to the cells of the N-dimensional potential field array.

16. The target orientated artificial intelligence system of claim 15, wherein the artificial intelligence potential field imaging module when executed by the one or more processors cause the one or more processors to assign color intensity values to the pixels of the N-dimensional potential field image, the color-intensity values being based on a corresponding value of the N-dimensional potential field array and a look-up table.

17. The target orientated artificial intelligence system of claim 15, wherein the origin value represents a current vehicle position of a vehicle and the destination value represents an intended vehicle destination position of the vehicle.

18. The target orientated artificial intelligence system of claim 15, wherein the artificial intelligence potential field imaging module when executed by the one or more processors cause the one or more processors to compute numerical values for the cells, represented by row index i and column index j, of the plurality of cells with respect to the target position by:
dividing an area of K by K m$^2$ around the current position into a grid of equal number of cells (M) along an axis, a dimension of the cells are k by k m$^2$ where k=K/M, wherein a distance ($d_{ELij}$) to the cells to the current position is expressed as $$d_{ELij} = \sqrt{\left(\left(i - \frac{M}{2}\right)*k\right)^2 + \left(\left(j - \frac{M}{2}\right)*k\right)^2}$$

wherein a distance ($d_{TE}$) between the target position and the current position based on coordinates,
wherein the numerical values for the cells of the plurality of cells with respect to a target position (dTLij) between a cell and the target position is expressed as:

$$d_{TLij} = \sqrt{d_{ELij}^2 + d_{TE}^2 + 2*d_{ELij}*d_{TE}*\cos(\theta)},$$

and
wherein θ is an angle made between lines connecting current position and cell and current position and target.

19. The target orientated artificial intelligence system of claim 18, wherein the potential values (φij) for cells of the plurality of cells are expressed as:

$$\varphi_{ij} = e^{-\left(\frac{d_{TLij}^2}{2\sigma^2}\right)},$$

wherein σ is a pre-defined standard deviation value.

20. The target orientated artificial intelligence system of claim 15, wherein the origin value and the destination value are represented as coordinates of from a Global Navigation Satellite System.

\* \* \* \* \*